US010403425B2

(12) United States Patent
Butler et al.

(10) Patent No.: US 10,403,425 B2
(45) Date of Patent: *Sep. 3, 2019

(54) LAYERED HEUSLER ALLOYS AND METHODS FOR THE FABRICATION AND USE THEREOF

(71) Applicant: The Board of Trustees of the University of Alabama, Tuscaloosa, AL (US)

(72) Inventors: William H. Butler, Tuscaloosa, AL (US); Kamaram Munira, Tuscaloosa, AL (US); Javad Ghasemi Azadani, Tuscaloosa, AL (US)

(73) Assignee: The Board of Trustees of the University of Alabama, Tuscaloosa, AL (US)

(*) Notice: Subject to any disclaimer, the term of this patent is extended or adjusted under 35 U.S.C. 154(b) by 276 days.

This patent is subject to a terminal disclaimer.

(21) Appl. No.: 15/477,486

(22) Filed: Apr. 3, 2017

(65) Prior Publication Data

US 2017/0207016 A1 Jul. 20, 2017

Related U.S. Application Data

(63) Continuation of application No. 14/956,827, filed on Dec. 2, 2015, now Pat. No. 9,643,385.

(51) Int. Cl.
H01F 10/32 (2006.01)
B32B 15/01 (2006.01)
(Continued)

(52) U.S. Cl.
CPC ............ H01F 10/32 (2013.01); B32B 15/01 (2013.01); B32B 15/043 (2013.01); C22C 5/04 (2013.01);
(Continued)

(58) Field of Classification Search
None
See application file for complete search history.

(56) References Cited

U.S. PATENT DOCUMENTS 9,634,241 B2 * 4/2017 Butler ............... H01L 43/08
9,643,385 B1 * 5/2017 Butler ............... B32B 15/01
(Continued)

FOREIGN PATENT DOCUMENTS

WO 2014163121 A1 10/2014

OTHER PUBLICATIONS

Half-metal wikipedia entry (Year: 2019).*
(Continued)

Primary Examiner — Kevin M Bernatz
(74) Attorney, Agent, or Firm — Meunier Carlin & Curfman LLC

(57) ABSTRACT

Disclosed herein are layered Heusler alloys. The layered Heusler alloys can comprise a first layer comprising a first Heusler alloy with a face-centered cubic (fcc) crystal structure and a second layer comprising a second Heusler alloy with a fcc crystal structure, the second Heusler alloy being different than the first Heusler alloy, wherein the first layer and the second layer are layered along a layering direction, the layering direction being the [110] or [111] direction of the fcc crystal structure, thereby forming the layered Heusler alloy.

18 Claims, 4 Drawing Sheets

(51) Int. Cl.
| | |
|---|---|
| C22C 38/14 | (2006.01) |
| C22C 38/06 | (2006.01) |
| C22C 38/04 | (2006.01) |
| C22C 38/02 | (2006.01) |
| C22C 38/00 | (2006.01) |
| C22C 27/00 | (2006.01) |
| C22C 19/07 | (2006.01) |
| C22C 19/03 | (2006.01) |
| C22C 5/04 | (2006.01) |
| B32B 15/04 | (2006.01) |
| H01F 10/12 | (2006.01) |
| H01F 10/14 | (2006.01) |
| H01F 10/16 | (2006.01) |

(52) U.S. Cl.
CPC .............. C22C 19/03 (2013.01); C22C 19/07 (2013.01); C22C 27/00 (2013.01); C22C 38/002 (2013.01); C22C 38/02 (2013.01); C22C 38/04 (2013.01); C22C 38/06 (2013.01); C22C 38/14 (2013.01); H01F 10/12 (2013.01); H01F 10/14 (2013.01); H01F 10/145 (2013.01); H01F 10/16 (2013.01); B32B 2457/00 (2013.01)

(56) References Cited

U.S. PATENT DOCUMENTS

| | | | |
|---|---|---|---|
| 2005/0073778 | A1 | 4/2005 | Hasegawa et al. |
| 2005/0074634 | A1 | 4/2005 | Hasegawa et al. |
| 2006/0203396 | A1 | 9/2006 | Ide et al. |
| 2006/0285258 | A1 | 12/2006 | Nishimura et al. |
| 2007/0274010 | A1 | 11/2007 | Hirata et al. |
| 2013/0094284 | A1* | 4/2013 | Ohno .................. H01L 27/228 365/158 |
| 2014/0300996 | A1 | 10/2014 | Murakami et al. |
| 2014/0334041 | A1 | 11/2014 | Hase et al. |
| 2016/0019917 | A1 | 1/2016 | Du et al. |
| 2016/0043301 | A1 | 2/2016 | Butler et al. |

OTHER PUBLICATIONS

Heusler alloy wikipedia entry (Year: 2019).*
Non-Final Office Action dated Sep. 9, 2016, for U.S. Appl. No. 14/956,827.
Ando, et al., "Tunnel Magnetoresistance Effect in Tunnel Junctions with Co2MnSi Heusler Alloy Electrode and MgO Barrier", Dept of Appl. Phys. 2013, 355-366.
Antonov, et al., "Computationally based explanation of the peculiar magneto-optical properties of PtMnSb and related ternary compounds" Phys. Rev. B 1997, 56(20), 13012-13025.
Antonov, et al., "Theoretical study of the electronic and magnetic structures of the Heusler alloys Co2Cr1—xFexAl", Phys. Rev. B 2005, 72, 054441-12.
Apalkov, et al., "Spin-transfer torque magnetic random access memory (STT-MRAM)" J. Emerg. Technol. Comput. Syst. 2013, 9(2).
Atwood, et al., "Future directions and challenges for etox flash memory scaling" IEEE Trans. on Device and Materials Reliability, 2004, 4(3), 301-305.
Balke, et al., "Properties of the quaternary half-metal-type Heusler alloy Co2Mn1—xFexSi", Phys. Rev. B 2006, 74, 104405-10.
Barth, et al., "Anomalous transport properties of the half-metallic ferromagnets Co2TiSi, Co2TiGe and Co2TiSn", Phil. Trans. R. Soc. A 2011, 369, 3588-3601.
Baumann, et al., "Soft errors in advanced computer systems" IEEE Design Test of Computers 2005, 22(3), 258-266.
Brown, et al., "Magnetisation density in the Heusler Alloy Fe2MnSi", J. Magnetism Magnetic Mater. 1985, 50(2), 169-177.
Chen, et al., "Ab initio prediction of half-metallic properties for the ferromagnetic Heusler Alloys Co 2M Si (M=Ti, V , Cr )", J. Appl. Phys. 2006, 100, 113901-4.
Culbert, et al., "Half-metallic L 2 1 structures with (001) planar insertions", J. Appl. Phys. 2008, 103, 07D707-3.
Dinh, et al., "New High-Tc Half-Heusler Ferromagnets NiMnZ (Z ¼ Si, P, Ge, As)", J. Phys. Soc. Jpn. 2008, 77, 014705-6.
Fruchart, et al., "Crystallographic and Magnetic Properties of Solid Solutions of the Phosphides M 2P, M =Cr, Mn, Fe, Co, and Ni", J. Appl. Phys. 1969, 40(3), 1250-1257.
Fujii, et al., "Electronic structures and magnetic properties of Fe2P,Co2P and CoMnP", J. Physics F: Metal Physics 1988, 18, 971-980.
Galanakis, et al., "Ab initio electronic and magnetic properties of half-metallic NiCrSi and NiMnSi Heusler alloys: The role of defects and interfaces", J. Appl. Phys. 2008(a) 104, 083916-15.
Galanakis, et al., "Electronic structure and Slater-Pauling behavior in half-metallic Heusler Alloys calculated from first principles", J. Phys. D: Appl. Phys. 2006, 39, 765-775.
Galanakis, et al., "Magnetic phase transition in half-metallic CoMnSb and NiMnSb semi-Heusler Alloys upon Cu doping: First-principles calculations", Phys. Rev. B 2008(b), 77, 214417-5.
Gasi, et al., "Structural and magnetic properties of the Heusler compound Fe2MnGa", J. Appl. Phys. 2013,113, 17E301.
Hamad, et al., "The effect of defects on the electronic and magnetic properties of Fe2MnSi Heusler Alloy", Phys. Status Solidi B 2011, 248(12), 2893-2898.
Han, et al., "Preserving stable 100% spin polarization at (111) heterostructures of half-metallic Heusler Alloy Co2VGa with semiconductor PbS" J. Appl. Phys. 2012, 112, 083710-5.
Hirohata, et al., "Future perspectives for spintronic devices", J. Phys. D: Appl. Phys. 2014, 47, 193001-40.
Huang, et al., "First-principles investigation of the electronic structure and magnetism of Heusler Alloys CoMnSb and Co2MnSb", Physica B: Condensed Matter 2011, 406, 1368-1373.
Inomata, et al., "Structural and magnetic properties and tunnel magnetoresistance for Co2(Cr,Fe)Al and Co2FeSi full-Heusler Alloys", J. Phys. D: Appl. Phys. 2006, 39, 816-823.
Kammerer, et al., "Co 2 Mn Si Heusler alloy as magnetic electrodes in magnetic tunnel junctions", Appl. Phys. Lett. 2004,85, 79-81.
Kanbur, et al., "Half-metallic magnetism of Co2CrX (X¼As, Sb) Heusler compounds: An ab initio study", J. Magnetism Magnetic Mater., 2011, 323, 1156-1160.
Kandpal, et al., "Correlation in the transition-metal-based Heusler compounds Co2MnSi and Co2FeSi", Phys. Rev. B 2006(b), 73, 094422-11.
Kandpal, et al., "Covalent bonding and the nature of band gaps in some half-Heusler compounds", J. Phys. D: Appl. Phys. 2006(a), 39, 776-785.
Kanomata, et al., "Magnetic properties of the half-metallic Heusler Alloys Co2VAl and Co2VGa under pressure", Phys. Rev. B 2010, 82, 144415-7.
Kawaharada, et al., "High temperature thermoelectric properties of CoTiSb half-Heusler compounds", J. Alloys Compounds 2004, 384, 308-311.
Kim, et al., "Characterization of Heusler alloy thin film, Cu2MnAl and Co2MnSi, deposited by co-sputtering method", Physica Status Solidi B. 2004, 241(7), 1557-1560.
Kresse, et al., "Ab initio Molecular Dynamics for Liquid Metals", Phys. Rev. B 1993, 47, 558-561.
Kresse, et al., "Efficient iterative schemes for ab initio total-energy calculations using a plane-wave basis set", Phys. Rev. B 1996, 54, 11169-11186.
Kubler, et al., "Understanding the trend in the Curie temperatures of Co2-based Heusler compounds: Ab initio calculations", Phys. Rev. B 2007, 76, 024414-7.
Kudryavtse, et al., "Electronic structure, magnetic and optical properties of Fe2MnGa Heusler Alloy", Acta Materialia 2012, 60, 4780-4786.
Liu, et al., "Origin of low Gilbert damping in half metals", J. Appl. Phys. 2009, 95, 022509-3.
Liu, et al., "Rational Design of Half-Metallic Heterostructures", Physics 2011, 1103.3855.

(56) References Cited

OTHER PUBLICATIONS

Luo, et al., "Half-metallicity in Fe-based Heusler Alloys Fe2TiZ (Z ¼ Ga, Ge, As, In, Sn and Sb)", J. Magnetism Magnetic Mater. 2012, 324, 3295-3299.

Mahmoud, et al., "The effect of defects on the electronic and magnetic properties of the Co2VSn full Heusler Alloy: Ab-initio calculations", Intermetallics 2013, 33, 33-37.

Manea, et al., "Heusler bulk materials as targets for pulsed laser deposition: growth and characterisation", J. Crystal Growth 2005, 275, e1787-e1792.

Meinert, et al., "Experimental realization of a semiconducting full-Heusler compound: Fe2TiSi", Phys. Rev. B 2014, 90, 085127-5.

Miura, et al., "Atomic disorder effects on half-metallicity of the full-Heusler Alloys Co2(Cr1—Fex) Al: A first-principles study", Phys. Rev. B 2004, 69, 144413-7.

Mori, et al., "Electronic band structure calculations on thin films of the L21 full Heusler Alloys X2YSi (X, Y=Mn, Fe, and Co): Toward spintronic materials", Thin Solid Films 2012, 520, 4979-4983.

Munira, et al., "A Quasi-analytical model for energy-delay-reliability tradeoff studies during write operations in a perpendicular STT-RAM cell", IEEE Trans-actions on Electron Devices 2012, 59(8), 2221-2226.

Munira, et al., "Achieving perpendicular anisotropy in half-metallic Heusler Alloys for spin device applications", J. Appl. Phys. 2014, 115, 17B731-3.

Pauling, "The Nature of the Interatomic in Metals", Phys. Rev. 1938, 54, 899-904.

Picozzi, et al., "Role of structural defects on the half-metallic character of Co2MnGe and Co2MnSi Heusler Alloys", Phys. Rev. B 2004, 69, 094423-7.

Prathiba, et al., "Half metallicCo2TiGe—a theoretical and experimental investigation", J. Magnetism Magnetic Mater. 2011, 323, 22-27.

Rai, et al., "Study of energy bands and magnetic properties of Co2CrSi Heusler Alloy", Bulletin of Materials Science 2011, 34(6), 1219-1222.

Sakuraba, et al., "Giant tunneling magnetoresistance in Co2MnSi/Al—O/Co2MnSi magnetic tunnel junctions", Appl. Phys. Lett. 2006(b), 88, 192508-3.

Sakuraba, et al., "Magnetic tunnel junctions using B2-ordered Co2MnAl Heusler Alloy epitaxial electrode", Appl. Phys. Lett. 2006(a), 88, 022503-3.

Singh, et al., "First principle prediction of half metallic ferromagnetism in Heusler NiMnZ (Z=P, Ge) compounds", AIP Conference Proceedings 2011, 1393, 165-166.

Skaftouros, et al., "Generalized Slater-Pauling rule for the inverse Heusler compounds", Phys. Rev. B 2013, 87, 024420-7.

Slater, et al., "Electronic Structure of Alloys", J. Appl. Phys. 1937, 8, 385-390.

Tirpanci, et al., "Design of half-metallic Heusler-based superlattices with vanishing net magnetization", J. Appl. Phys. 2013, 113, 043912-4.

Vinesh, et al., "Magnetic anisotropy induced by high energy ball milling of Fe 2 MnAl", J. Appl. Phys. 2009, 105, 07A309-3.

Wang, et al., "Correlation hole of the spin-polarized electron gas, with exact small-wave-vector and high-density scaling", Phys. Rev. B 1991, 44(24), 13298-13307.

Wang, et al., "Magnetic properties and spin polarization of Co2MnSi Heusler Alloy thin films epitaxially grown on GaAs(001)", Phys. Rev. B 2005, 71, 144416-14.

Wen, et al., "Perpendicular magnetization of Co2FeAl full-Heusler Alloy films induced by MgO interface", Appl. Phys. Lett. 2011, 98, 242507-3.

Wolf, et al., "Spintronics: A Spin-Based Electronics Vision for the Future", Science 2001, 294, 1488-1495.

Wurmehl, et al., "Geometric, electronic, and magnetic structure of Co2FeSi: Curie temperature and magnetic moment measurements and calculations", Phys. Rev. B 2005, 72, 184434-9.

Zhirnov, et al., "An Assessment of New Field-Effect Transistor, resonant tunnel device, Single-Electron Transistor, and Quantum Cellular automata Technologies", IEEE Circuits and Devices Magazine 2005, 21(3), 37-46.

\* cited by examiner

LAYERED HEUSLER ALLOYS AND METHODS FOR THE FABRICATION AND USE THEREOF

CROSS REFERENCE TO RELATED APPLICATIONS

This application is a continuation of U.S. Ser. No. 14/956,827, filed Dec. 2, 2015, issued as U.S. Pat. No. 9,643,385 on May 9, 2017, which is hereby incorporated herein by reference in its entirety.

STATEMENT OF GOVERNMENT SUPPORT

This invention was made with government support under Grant No. 1235396 awarded by the National Science Foundation and Agreement No. HR0011-13-3-0002 awarded by the Defense Advanced Research Projects Agency. The government has certain rights in this invention.

BACKGROUND

Memory and logic devices that utilize the electron's spin have elicited interest recently, in part because of scalability and power consumption issues associated with more conventional electronic devices. The performance of many of these "spintronic" devices can be enhanced by the availability of a material in the form of a thin film that combines highly spin-polarized electron currents with magnetic anisotropy perpendicular to the plane of the film.

SUMMARY

Disclosed herein are layered Heusler alloys. The layered Heusler alloys can comprise a first layer comprising a first Heusler alloy with a face-centered cubic (fcc) crystal structure and a second layer comprising a second Heusler alloy with a fcc crystal structure, the second Heusler alloy being different than the first Heusler alloy, wherein the first layer and the second layer are layered along a layering direction, the layering direction being the [110] or [111] direction of the fcc crystal structure, thereby forming the layered Heusler alloy. In some examples, the layered Heusler alloy can further comprise a third layer comprising a third Heusler alloy with a fcc crystal structure, and the first layer, the second layer, and the third layer are layered along the layering direction. The third Heusler alloy can be different than the first Heusler alloy and/or the second Heusler alloy.

In some examples, the first Heusler alloy can have a formula of $A_pBC$, wherein p is 1 or 2; A and B are each a transition metal, with the proviso that A and B are not the same transition metal; and C is an element from Group 13, 14, or 15. In some examples, A and B are selected from the group consisting of: scandium, titanium, vanadium, chromium, manganese, iron, cobalt, nickel, yttrium, zirconium, niobium, molybdenum, technetium, ruthenium, rhodium, and palladium. In some examples, A and B are selected from the group consisting of: titanium, vanadium, chromium, manganese, iron, cobalt, nickel, rhodium, and palladium. In some examples, C is selected from the group consisting of: boron, aluminum, gallium, indium, thallium, carbon, silicon, germanium, tin, lead, nitrogen, phosphorus, arsenic, antimony, and bismuth. In some examples, C is selected from the group consisting of: aluminum, gallium, silicon, germanium, tin, phosphorus, arsenic, and antimony.

In some examples, the second Heusler alloy can have formula of $X_qYZ$, wherein q is 1 or 2; X and Y are each a transition metal, with the proviso that X and Y are not the same transition metal; and Z is an element from Group 13, 14, or 15. In some examples, X and Y are selected from the group consisting of: scandium, titanium, vanadium, chromium, manganese, iron, cobalt, nickel, yttrium, zirconium, niobium, molybdenum, technetium, ruthenium, rhodium, and palladium. In some examples, X and Y are selected from the group consisting of: titanium, vanadium, chromium, manganese, iron, cobalt, nickel, rhodium, and palladium. In some examples, Z is selected from the group consisting of: boron, aluminum, gallium, indium, thallium, carbon, silicon, germanium, tin, lead, nitrogen, phosphorus, arsenic, antimony, and bismuth. In some examples, Z is selected from the group consisting of: aluminum, gallium, silicon, germanium, tin, phosphorus, arsenic, and antimony.

In some examples, the first Heusler alloy and the second Heusler alloy can be selected from the group consisting of $Co_2CrSi$, $Co_2CrSb$, $Co_2FeAl$, $Co_2FeGe$, $Co_2FeSi$, $Co_2MnAl$, $Co_2MnGa$, $Co_2MnGe$, $Co_2MnSi$, $Co_2MnSb$, $Co_2TiGe$, $Co_2VGa$, $Co_2VSn$, $Cu_2MnAl$, $Cu_2MnIn$, $Cu_2MnSn$, $Cu_2MnBi$, $Fe_2MnAl$, $Fe_2MnGa$, $Fe_2MnSi$, $Fe_2TiGe$, $Fe_2TiSi$, $Fe_2VAl$, $Mn_2VGa$, $Ni_2MnAl$, $Ni_2MnIn$, $Ni_2MnGa$, $Pd_2MnAl$, $Pd_2MnIn$, CoMnP, CoTiP, RhFeGe, RuMnAs, NiMnP, NiMnSi, and CoTiSi. In some examples, the first Heusler alloy and the second Heusler alloy can be selected from the group consisting of $Co_2CrSi$, $Co_2CrSb$, $Co_2FeSi$, $Co_2MnAl$, $Co_2MnSi$, $Co_2MnSb$, $Co_2TiGe$, $Co_2VGa$, $Co_2VSn$, $Fe_2MnAl$, $Fe_2MnGa$, $Fe_2MnSi$, $Fe_2TiGe$, $Fe_2TiSi$, CoMnP, CoTiP, RhFeGe, RuMnAs, NiMnP, NiMnSi, NiMnAs, NiMnSb, NiVSb, CoMnSb, and CoTiSi.

In some examples, the first Heusler alloy comprises a half metal or a near half metal. In some examples, the second Heusler alloy comprises a half metal or a near half metal. In some examples, the layered Heusler alloy comprises a half metal or a near half metal. In some examples, the layered Heusler alloy has a Fermi level and a gapped spin-channel with a gap, and wherein the Fermi level of the layered Heusler alloy falls within the gap of the gapped spin-channel of the layered Heusler alloy In some examples, the layered Heusler alloy is layered along the [110] direction. In some examples, when the layered Heusler alloy is layered along the [110] direction, the first layer can comprise a first number of sublayers; the second layer can comprise a second number of sublayers; and the first number of sublayers is the same as the second number of sublayers, such that the layered Heusler alloy has a unit cell comprising $(A_pBC)_a(X_qYZ)_a$, wherein a is the first number of sublayers and a is an integer from 1 to 1000. In other embodiments, more than 1000 layers can be present. The skilled artisan can use as many layers as desired.

In some examples, the layered Heusler alloy is layered along the [111] direction. In some examples, when the layered Heusler alloy is layered along the [111] direction, the first layer comprises a first number of sublayers, the first number of sublayers being 4, 6, or 8; the second layer comprises a second number of sublayers, the second number of sublayers being 4, 6, or 8; and the sum of the first number of sublayers and second number of sublayers is 12. In some examples, when the first number of sublayers is 4, the layered Heusler alloy has a unit cell comprising $(A_pBC)(X_qYZ)_2$, wherein p and q are independently 1 or 2. In some examples, when the first number of sublayers is 8, the layered Heusler alloy has a unit cell comprising $(A_pBC)_2(X_qYZ)$, wherein p and q are independently 1 or 2. In some examples, when the first number of sublayers is 6, the layered Heusler alloy has a unit cell comprising: $(A_pBC)$ $(A_{p-1}BZ)(X_qYZ)$, wherein p and q are independently 1 or 2.

In some examples, the magnetocrystalline anisotropy of the layered Heusler alloy along a direction perpendicular to the layering direction can be from greater than 0 J/m$^3$ to 10$^6$ J/m$^3$.

In some examples, the layered Heusler alloy has a $\mu_0H_{eff}$ of from −10 to 10$^{10}$ N A$^{-1}$ m$^{-1}$. In some examples, the magnetocrystalline anisotropy of the layered Heusler alloy is large enough to overcome a demagnetization field of a thin film. In some examples, the layered Heusler alloy has a $\mu_0H_{eff}$ of greater than 0 N A$^{-1}$ m$^{-1}$.

In some examples, the layered Heusler alloys described herein can have high spin polarization at the Fermi energy, low damping, low resistivity, high spin-torque efficiency, high tunneling magnetoresistance, or a combination thereof. In some examples, the layered Heusler alloys described herein can be compatible with Heusler semiconductors.

Methods of making and uses of the layered Heusler alloys are also described herein.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1A:
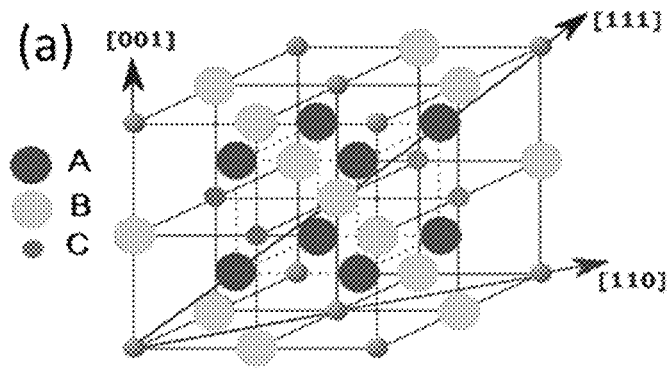
FIG. 1A displays the schematic crystal structure for a L2$_1$ full Heusler A$_2$BC. The crystalline structure is cubic in nature (fcc).

The compositions and methods described herein may be understood more readily by reference to the following detailed description of specific aspects of the disclosed subject matter and the Examples and Figures included therein.

Before the present compositions and methods are disclosed and described, it is to be understood that this disclosure is not limited to specific synthetic methods or to particular reagents, as such may, of course, vary. It is also to be understood that the terminology used herein is for the purpose of describing particular embodiments only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

The term "comprising" and variations thereof as used herein is used synonymously with the term "including" and variations thereof and are open, non-limiting terms. Although the terms "comprising" and "including" have been used herein to describe various examples, the terms "consisting essentially of" and "consisting of" can be used in place of "comprising" and "including" to provide for more specific examples of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

It is understood that throughout this specification the identifiers "first", "second" and "third" are used solely to aid in distinguishing the various components and steps of the disclosed subject matter. The identifiers "first", "second" and "third" are not intended to imply any particular order, amount, preference, or importance to the components or steps modified by these terms.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Reference will now be made in detail to specific aspects of the disclosed materials, compounds, compositions, articles, and methods, examples of which are illustrated in the accompanying examples and figures.

Layered Heusler Alloys

Disclosed herein are layered Heusler alloys. The layered Heusler alloys can comprise a first layer comprising a first Heusler alloy with a face-centered cubic (fcc) crystal structure and a second layer comprising a second Heusler alloy with a fcc crystal structure, the second Heusler alloy being different than the first Heusler alloy, wherein the first layer and the second layer are layered along a layering direction, the layering direction being the [110] or [111] direction of the fcc crystal structure, thereby forming the layered Heusler alloy. As used herein, the layering direction being the [110] or [111] direction of the fcc crystal structure also includes those directions that are equivalent to the [110] or [111] direction of the fcc crystal due to symmetry of the fcc crystal. Directions equivalent to the [110] or [111] directions of the fcc crystal structure due to symmetry will be known to those of skill in the art. For example, in the fcc crystal structure, the [001], [010], [00$\bar{1}$], [0$\bar{1}$0] and [$\bar{1}$00] directions are all equivalent by symmetry.

In some examples, the layered Heusler alloy can further comprise a third layer comprising a third Heusler alloy with a fcc crystal structure, and the first layer, the second layer, and the third layer are layered along the layering direction. The third Heusler alloy can be different than the first Heusler alloy and/or the second Heusler alloy.

Figure 1B:
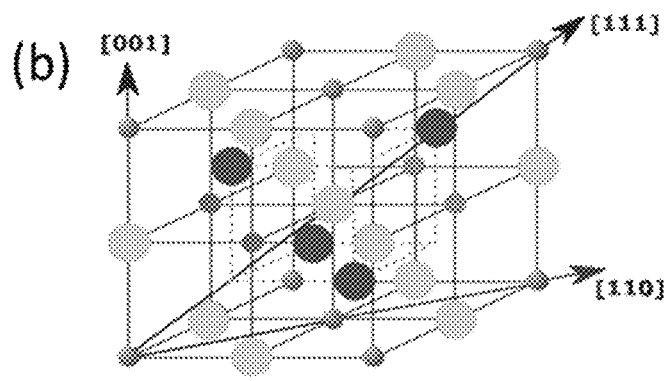
FIG. 1B displays the schematic crystal structure for a C1$_b$ half Heusler ABC. The crystalline structure is cubic in nature (fcc).

The first Heusler alloy can comprise any full- or half-Heusler alloy. In some examples, the first Heusler alloy can have a formula of $A_pBC$, wherein p is 1 or 2; A and B are each a transition metal, with the proviso that A and B are not the same transition metal; and C is an element from Group 13, 14, or 15. When p is 2, the first Heusler alloy is a full-Heusler alloy with a $L2_1$ crystal structure and a unit cell formula of $A_2BC$, as shown in FIG. 1A. The $L2_1$ structure is fcc with a 4 atom basis. When p is 1, the first Heusler alloy comprises a half-Heusler alloy with a $C1_b$ crystal structure and a unit cell formula of ABC, as shown in FIG. 1B. The $C1_b$ structure is fcc with a 3 atom basis. The description of the layered Heusler alloys herein will be based on the directions relative to the fcc cells, for example as shown in FIGS. 1A and 1B.

In some examples, A and B are selected from the group consisting of: scandium, titanium, vanadium, chromium, manganese, iron, cobalt, nickel, yttrium, zirconium, niobium, molybdenum, technetium, ruthenium, rhodium, and palladium. In some examples, A and B are selected from the group consisting of: titanium, vanadium, chromium, manganese, iron, cobalt, nickel, rhodium, and palladium.

In some examples, C is selected from the group consisting of: boron, aluminum, gallium, indium, thallium, carbon, silicon, germanium, tin, lead, nitrogen, phosphorus, arsenic, antimony, and bismuth. In some examples, C is selected from the group consisting of: aluminum, gallium, silicon, germanium, tin, phosphorus, arsenic, and antimony.

The second Heusler alloy can comprise any full- or half-Heusler alloy. In some examples, the second Heusler alloy can have formula of $X_qYZ$, wherein q is 1 or 2; X and Y are each a transition metal, with the proviso that X and Y are not the same transition metal; and Z is an element from Group 13, 14, or 15. When q is 1, the second Heusler alloy is a half-Heusler alloy with a $C1_b$ crystal structure and a unit cell of XYZ. When q is 2, the second Heusler alloy is a full-Heusler alloy with a $L2_1$ crystal structure.

In some examples, X and Y are selected from the group consisting of: scandium, titanium, vanadium, chromium, manganese, iron, cobalt, nickel, yttrium, zirconium, niobium, molybdenum, technetium, ruthenium, rhodium, and palladium. In some examples, X and Y are selected from the group consisting of: titanium, vanadium, chromium, manganese, iron, cobalt, nickel, rhodium, and palladium.

In some examples, Z is selected from the group consisting of: boron, aluminum, gallium, indium, thallium, carbon, silicon, germanium, tin, lead, nitrogen, phosphorus, arsenic, antimony, and bismuth. In some examples, Z is selected from the group consisting of: aluminum, gallium, germanium, tin, phosphorus, arsenic, and antimony.

The first Heusler alloy and the second Heusler alloy are different. In some examples, when the first Heusler alloy is $A_pBC$ and the second Heusler alloy is $X_qYZ$, A and X are not the same transition metal. In some examples, when the first Heusler alloy is $A_pBC$ and the second Heusler alloy is $X_qYZ$, B and Y are not the same transition metal. In some examples, when the first Heusler alloy is $A_pBC$ and the second Heusler alloy is $X_qYZ$, C and Z are not the same element from Group 13, 14, or 15.

In some examples, the first Heusler alloy and the second Heusler alloy can be selected from the group consisting of $Co_2CrSi$, $Co_2CrSb$, $Co_2FeAl$, $Co_2FeGe$, $Co_2FeSi$, $Co_2MnAl$, $Co_2MnGa$, $Co_2MnGe$, $Co_2MnSi$, $Co_2MnSb$, $Co_2TiGe$, $Co_2VGa$, $Co_2VSn$, $Cu_2MnAl$, $Cu_2MnIn$, $Cu_2MnSn$, $Cu_2MnBi$, $Fe_2MnAl$, $Fe_2MnGa$, $Fe_2MnSi$, $Fe_2TiGe$, $Fe_2TiSi$, $Fe_2VAl$, $Mn_2VGa$, $Ni_2MnAl$, $Ni_2MnIn$, $Ni_2MnGa$, $Pd_2MnAl$, $Pd_2MnIn$, CoMnP, CoTiP, RhFeGe, RuMnAs, NiMnP, NiMnSi, and CoTiSi. In some examples, the first Heusler alloy and the second Heusler alloy can be selected from the group consisting of $Co_2CrSi$, $Co_2CrSb$, $Co_2FeSi$, $Co_2MnAl$, $Co_2MnSi$, $Co_2MnSb$, $Co_2TiGe$, $Co_2VGa$, $Co_2VSn$, $Fe_2MnAl$, $Fe_2MnGa$, $Fe_2MnSi$, $Fe_2TiGe$, $Fe_2TiSi$, CoMnP, CoTiP, RhFeGe, RuMnAs, NiMnP, NiMnSi, NiMnAs, NiMnSb, NiVSb, CoMnSb, and CoTiSi.

In some examples, the first Heusler alloy comprises a half metal or a near half metal. As used herein, a Heusler alloy is a "half-metal" when the Fermi energy falls in a gap for one of the spin-channels, but not for the other. A "near half metal," on the other hand, occurs when the Fermi energy falls slightly outside the gap for one of the spin channels (Munira K et al. *J. Appl. Phys.* 2014, 115, 17B731). In some examples, the second Heusler alloy comprises a half metal or a near half metal. In some examples, the layered Heusler alloy comprises a half metal or a near half metal. In some examples, the layered Heusler alloy has a Fermi level and a gapped spin-channel with a gap, and wherein the Fermi level of the layered Heusler alloy falls within the gap of the gapped spin-channel of the layered Heusler alloy The highest Fermi-energy spin-polarization comes from ferromagnetic materials that exhibit half-metallic properties. In half-metals, the electronic structure of one of the spin channels is that of a metal while the other is that of an insulator or semiconductor (Munira K et al. *J. Appl. Phys.* 2014, 115, 17B731). In some examples, this can lead to 100% spin-polarization of the electron current, high magnetoresistance and high spin-torque efficiency. Half-metals can also have lower magnetic damping than typical ferromagnets (Liu C et al. *J. Appl. Phys.* 2009, 95, 2). Low damping can be beneficial for applications that utilize Spin-Torque transfer for switching of nanomagnets (Munira K et al. *IEEE Transactions on Electron Devices.* 2012, 59, 8).

In some examples, the layered Heusler alloy is layered along the [110] direction. In some examples, when the layered Heusler alloy is layered along the [110] direction, the first layer can a first number of sublayers; the second layer can comprise a second number of sublayers; and the first number of sublayers is the same as the second number of sublayers, such that the layered Heusler alloy has a unit cell comprising $(A_pBC)_a(X_qYZ)_a$, wherein a is the first number of sublayers and a is an integer from 1 to 1000. In some examples, there can be more than 1000 sublayers. In some examples, a is 1, 2, or 3.

Figure 3:
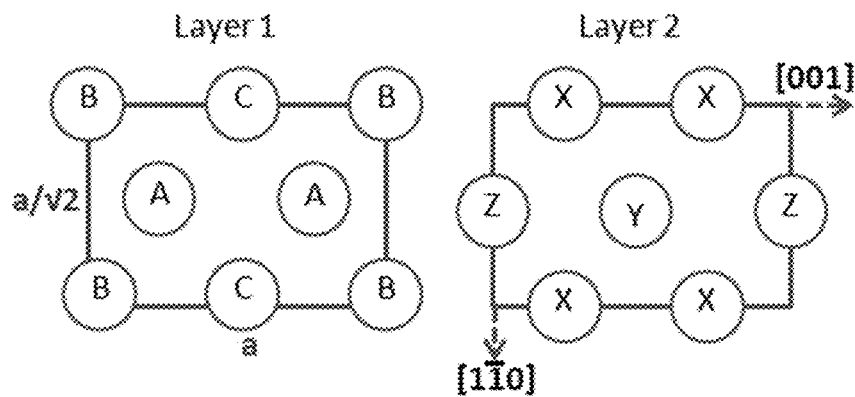
FIG. 3 displays a schematic representation of stacking in [110] direction for a full Heusler superlattice A$_2$BC-X$_2$YZ. The [001] and [1$\bar{1}$0] directions indicated in the figure corresponds to those in the fcc cell in FIG. 1A.

When the layered Heusler alloy is formed by stacking layers along the [110] direction, each layer is stoichiometric. Referring now to FIG. 3, a schematic for a first Heusler alloy comprising $A_2BC$ and a second Heusler alloy comprising $X_2YZ$ being layered along the [110] direction, with the first layer and second layer each having one sublayer is shown. As shown in FIG. 3, atoms A, B and C are each present in the first (sub)layer and X, Y, and Z atoms are each present in the second (sub)layer. The unit cell in FIG. 3 corresponds to the first layer and second layer each having one sublayer, for which one layer of each constituent alternates one after another ( . . . -$A_2BC$-$X_2YZ$- . . . ). For two and three sublayers, the thickness of each layer of the layered Heusler alloy is increased by 2 ( . . . -$A_2BC$-$A_2BC$-$X_2YZ$-$X_2YZ$- . . . ) and 3 times ( . . . -$A_2BC$-$A_2BC$-$A_2BC$-$X_2YZ$-$X_2YZ$-$X_2YZ$- . . . ), respectively.

If the first Heusler alloy and the second Heusler alloy were each a half-Heusler, one of the A atoms in the $A_2BC$ layer and one of the X atoms in the $X_2YZ$ layer of FIG. 3 would be replaced by a vacancy. The layered Heusler alloy formed from two half-Heuslers (e.g., the first Heusler alloy being ABC and the second Heusler alloy being XYZ) with 1, 2 and 3 sublayers corresponds to ( . . . -ABC-XYZ- . . . ), ( . . . -ABC-ABC-XYZ-XYZ- . . . ) and ( . . . -ABC-ABC-ABC-XYZ-XYZ-XYZ- . . . ), respectively.

In some examples, when the layered Heusler alloy is layered along the [110] direction, the first Heusler alloy is $A_pBC$, and the second Heusler alloy is $X_qYZ$, A and X are not the same transition metal. In some examples, when the layered Heusler alloy is layered along the [110] direction, the first Heusler alloy is $A_pBC$, and the second Heusler alloy is $X_qYZ$, B and Y are not the same transition metal and C and Z are not the same element from Group 13, 14, or 15.

In some examples, the layered Heusler alloy is layered along the [111] direction. In some examples, when the layered Heusler alloy is layered along the [111] direction, the first layer comprises a first number of sublayers, the first number of sublayers being 4, 6, or 8; the second layer comprises a second number of sublayers, the second number of sublayers being 4, 6, or 8; and the sum of the first number of sublayers and second number of sublayers is 12. In some examples, when the first number of sublayers is 4, the layered Heusler alloy has a unit cell comprising $(A_pBC)(X_qYZ)_2$, wherein p and q are independently 1 or 2. In some examples, when the first number of sublayers is 8, the layered Heusler alloy has a unit cell comprising $(A_pBC)_2(X_qYZ)$, wherein p and q are independently 1 or 2. In some examples, when the first number of sublayers is 6, the layered Heusler alloy has a unit cell comprising: $(A_pBC)(A_{p-1}XBZ)(X_1YZ)$, when p and q are independently 1 or 2.

Figure 4:
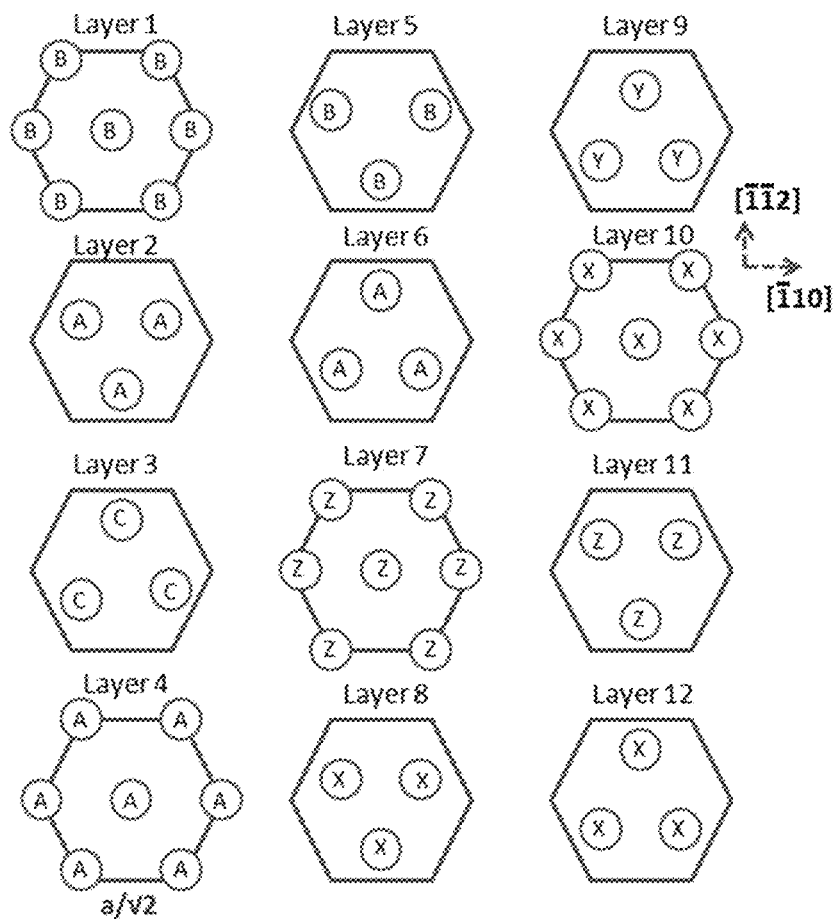
FIG. 4 displays a schematic representation of stacking in [111] direction for full Heusler superlattice A$_2$BC-X$_2$YZ. The [$\bar{1}\bar{1}$2] and [$\bar{1}$10] directions indicated in the figure are relative to axes defined for the fcc cell in FIG. 1A.

When the layered Heusler alloy is formed by stacking layers along the [111] direction, the layering can comprise the stacking of hexagonal nets, as can be seen from the depiction of layers perpendicular to the [111] direction shown in FIG. 4. The fcc cells shown in FIGS. 1A and 1B are also helpful in understanding [111] layering. The fcc lattice with a single atom basis can be viewed along the [111] direction as a succession of identical hexagonal layers with A-B-C stacking. The $L2_1$ structure is fcc but with a 4 atom basis. There is a single species on each layer. For full-Heuslers, for example with an $X_2YZ$ composition, the atomic layers perpendicular to the [111] direction follow the pattern of Y species on A, followed by X species on B, then Z species on C, X on A, Y on B, etc. In some examples, when the layered Heusler alloy is formed by stacking layers along the [111] direction, the correct stoichiometry for a full-Heusler (e.g., the first Heusler is $A_2BC$ and the second Heusler is $X_2YZ$) requires a minimum of 4 sublayers for each of the first Heusler alloy and the second Heusler alloy (e.g., at least 4 sublayers in each of the first layer and the second layer), and the total number of repeating sublayers must be divisible by three to make the A-B-C sequence repeat. Thus for the case wherein the first Heusler alloy is $A_2BC$ and the second Heusler alloy is $X_2YZ$, a minimum of 12 sublayers is required for the simulation of a Heusler superlattice stacked in this manner. As shown in FIG. 4, there may be six layers of $A_2BC$ and then six layers of $X_2YZ$. One can also have 8 layers of $A_2BC$ followed by 4 layers of $X_2YZ$ or vice versa. Half-Heuslers do not contain any atoms in the second, sixth and tenth layers in the schematic structure of FIG. 4.

Due to the spin-orbit interaction and the symmetry of the crystal, the magnetic moments of a material will want to point in a particular direction in an infinite or spherical crystal. Meanwhile, layered systems can have a special direction perpendicular to the layers. The difference in the energy per unit volume of the layered material when the moments are pointed perpendicular to the layers compared to the minimum energy when they point in the plane of the layers is the magnetocrystalline anisotropy, K (sometimes with a subscript "u", $K_u$). In other words, the magnetocrystalline anisotropy (K, sometimes with a subscript "u", $K_u$) of a layered Heusler alloy can be calculated by using the energy differences, $E_{in\text{-}plane} - E_{perpendicular}$, where $E_{perpendicular}$ represents the energy when magnetization orientation is perpendicular to the stacking planes and $E_{in\text{-}plane}$ is the energy when magnetization orientation is along any direction in the stacking plane. For example, for layered Heusler alloys layered in the [110] direction, the energy calculated for the [110] magnetization can be compared to that calculated for the in-plane magnetization directions [001], [1$\bar{1}$0], and [$\bar{1}$11]. For layered Heusler alloys layered in the [111] direction, for example, the energy calculated for the [111] magnetization can be compared to that calculated for the in-plane magnetization directions [$\bar{1}\bar{1}$2] and [$\bar{1}$10]. A positive value for the magnetocrystalline anisotropy (e.g., K>0) can indicate that the magnetization prefers to lie perpendicular to the Heusler planes, while a negative value indicates that the magnetization lies in-plane.

There is a different kind of anisotropy called shape anisotropy that can be important for a thin film. For a thin film, the moments want to lie head to tail (south adjacent to north), just like many small magnets, and they can best do this when they lie in-plane.

In some examples, the layered Heusler alloy can have a magnetocrystalline anisotropy of greater than 0 J/m³ along a direction perpendicular to the layering direction (e.g., 1 J/m³ or more, 2 J/m³ or more, 3 J/m³ or more, 4 J/m³ or more, 5 J/m³ or more, 6 J/m³ or more, 7 J/m³ or more, 8 J/m³ or more, 9 J/m³ or more, 10 J/m³ or more, 20 J/m³ or more, 30 J/m³ or more, 40 J/m³ or more, 50 J/m³ or more, 60 J/m³ or more, 70 J/m³ or more, 80 J/m³ or more, 90 J/m³ or more, 1×10² J/m³ or more, 2×10² J/m³ or more, 3×10² J/m³ or more, 4×10² J/m³ or more, 5×10² J/m³ or more, 6×10² J/m³ or more, 7×10² J/m³ or more, 8×10² J/m³ or more, 9×10² J/m³ or more, 1×10³ J/m³ or more, 2×10³ J/m³ or more, 3×10³ J/m³ or more, 4×10³ J/m³ or more, 5×10³ J/m³ or more, 6×10³ J/m³ or more, 7×10³ J/m³ or more, 8×10³ J/m³ or more, 9×10³ J/m³ or more, 1×10⁴ J/m³ or more, 2×10⁴ J/m³ or more, 3×10⁴ J/m³ or more, 4×10⁴ J/m³ or more, 5×10⁴ J/m³ or more, 6×10⁴ J/m³ or more, 7×10⁴ J/m³ or more, 8×10⁴ J/m³ or more, 9×10⁴ J/m³ or more, 1×10⁵ J/m³ or more, 2×10⁵ J/m³ or more, 3×10⁵ J/m³ or more, 4×10⁵ J/m³ or more, 5×10⁵ J/m³ or more, 6×10⁵ J/m³ or more, 7×10⁵ J/m³ or more, 8×10⁵ J/m³ or more, or 9×10⁵ J/m³ or more).

In some examples, the magnetocrystalline anisotropy of the layered Heusler alloy along a direction perpendicular to the layering direction can be 10⁶ J/m³ or less (e.g., 9×10⁵ J/m³ or less, 8×10⁵ J/m³ or less, 7×10⁵ J/m³ or less, 6×10⁵ J/m³ or less, 5×10⁵ J/m³ or less, 4×10⁵ J/m³ or less, 3×10⁵ J/m³ or less, 2×10⁵ J/m³ or less, 1×10⁵ J/m³ or less, 9×10⁴ J/m³ or less, 8×10⁴ J/m³ or less, 7×10⁴ J/m³ or less, 6×10⁴ J/m³ or less, 5×10⁴ J/m³ or less, 4×10⁴ J/m³ or less, 3×10⁴ J/m³ or less, 2×10⁴ J/m³ or less, 1×10⁴ J/m³ or less, 9×10³ J/m³ or less, 8×10³ J/m³ or less, 7×10³ J/m³ or less, 6×10³ J/m³ or less, 5×10³ J/m³ or less, 4×10³ J/m³ or less, 3×10³ J/m³ or less, 2×10³ J/m³ or less, 1×10³ J/m³ or less, 9×10² J/m³ or less, 8×10² J/m³ or less, 7×10² J/m³ or less, 6×10² J/m³ or less, 5×10² J/m³ or less, 4×10² J/m³ or less, 3×10² J/m³ or less, 2×10² J/m³ or less, 1×10² J/m³ or less, 90 J/m³ or less, 80 J/m³ or less, 70 J/m³ or less, 60 J/m³ or less, 50 J/m³ or less, 40 J/m³ or less, 30 J/m³ or less, 20 J/m³ or less, 10 J/m³ or less, 9 J/m³ or less, 8 J/m³ or less, 7 J/m³ or less, 6 J/m³ or less, 5 J/m³ or less, 4 J/m³ or less, 3 J/m³ or less, 2 J/m³ or less, or 1 J/m³ or less).

The magnetocrystalline anisotropy of the layered Heusler alloy along a direction perpendicular to the layering direction can range from any of the minimum values described above to any of the maximum values described above. For example, the magnetocrystalline anisotropy of the layered Heusler alloy along a direction perpendicular to the layering direction can be from greater than 0 J/m³ to 10⁶ J/m³ (e.g., from greater than 0 J/m³ to 1×10³ J/m³, from 1×10³ J/m³ to 10⁶ J/m³, from 0 J/m³ to 1×10² J/m³, from 1×10² J/m³ to 1×10⁴ J/m³, from 1×10⁴ J/m³ to 10⁶ J/m³, or from 10 J/m³ to 9×10⁵ J/m³).

The effective anisotropy field of a thin magnetic film, $H_{eff}$ (or, $\mu_0 H_{eff}$ where $\mu_0$ is the magnetic permeability constant), can be described by:

$$\mu_0 H_{eff} = \frac{2K - M_s^2}{M_s}$$

where $\mu_0$ is the magnetic permeability constant, K is the magnetocrystalline anisotropy, and $M_s$ is the saturation magnetization of the magnetic film due to magnetic dipole interactions. Accordingly, a thin magnetic film with no magnetocrystalline anisotropy (K=0) will have an effective anisotropy field of $\mu_0 H_{eff} = -M_s$. A positive value of $\mu_0 H_{eff}$ can indicate that the Heusler superlattice has enough perpendicular anisotropy to overcome the demagnetization field of a thin film.

In some examples, the layered Heusler alloy can have a $\mu_0 H_{eff}$ of −10 N A⁻¹ m⁻¹ or more (e.g., −5 N A⁻¹ m⁻¹ or more, 0 N A⁻¹ m⁻¹ or more, 5 N A⁻¹ m⁻¹ or more, 10 N A⁻¹ m⁻¹ or more, 20 N A⁻¹ m⁻¹ or more, 30 N A⁻¹ m⁻¹ or more, 40 N A⁻¹ m⁻¹ or more, 50 N A⁻¹ m⁻¹ or more, 60 N A⁻¹ m⁻¹ or more, 70 N A⁻¹ m⁻¹ or more, 80 N A⁻¹ m⁻¹ or more, 90 N A⁻¹ m⁻¹ or more, 1×10² N A⁻¹ m⁻¹ or more, 2×10² N A⁻¹ m⁻¹ or more, 3×10² N A⁻¹ m⁻¹ or more, 4×10² N A⁻¹ m⁻¹ or more, 5×10² N A⁻¹ m⁻¹ or more, 6×10² N A⁻¹ m⁻¹ or more, 7×10² N A⁻¹ m⁻¹ or more, 8×10² N A⁻¹ m⁻¹ or more, 9×10² N A⁻¹ m⁻¹ or more, 1×10³ N A⁻¹ m⁻¹ or more, 2.5×10³ N A⁻¹ m⁻¹ or more, 5×10³ N A⁻¹ m⁻¹ or more, 7.5×10³ N A⁻¹ m⁻¹ or more, 1×10⁴ N A⁻¹ m⁻¹ or more, 2.5×10⁴ N A⁻¹ m⁻¹ or more, 5×10⁴ N A⁻¹ m⁻¹ or more, 7.5×10⁴ N A⁻¹ m⁻¹ or more, 1×10⁵ N A⁻¹ m⁻¹ or more, 2.5×10⁵ N A⁻¹ m⁻¹ or more, 5×10⁵ N A⁻¹ m⁻¹ or more, 7.5×10⁵ N A⁻¹ m⁻¹ or more, 1×10⁶ N A⁻¹ m⁻¹ or more, 2.5×10⁶ N A⁻¹ m⁻¹ or more, 5×10⁶ N A⁻¹ m⁻¹ or more, 7.5×10⁶ N A⁻¹ m⁻¹ or more, 1×10⁷ N A⁻¹ m⁻¹ or more, 2.5×10⁷ N A⁻¹ m⁻¹ or more, 5×10⁷ N A⁻¹ m⁻¹ or more, 7.5×10⁷ N A⁻¹ m⁻¹ or more, 1×10⁸ N A⁻¹ m⁻¹ or more, 2.5×10⁸ N A⁻¹ m⁻¹ or more, 5×10⁸ N A⁻¹ m⁻¹ or more, 7.5×10⁸ N A⁻¹ m⁻¹ or more, 1×10⁹ N A⁻¹ m⁻¹ or more, 2.5×10⁹ N A⁻¹ m⁻¹ or more, 5×10⁹ N A⁻¹ m⁻¹ or more, or 7.5×10⁹ N A⁻¹ m⁻¹ or more).

In some examples, the layered Heusler alloy can have a $\mu_0 H_{eff}$ of 10¹⁰ N A⁻¹ m⁻¹ or less (e.g., 7.5×10⁹ N A⁻¹ m⁻¹ or less, 5×10⁹ N A⁻¹ m⁻¹ or less, 2.5×10⁹ N A⁻¹ m⁻¹ or less, 1×10⁹ N A⁻¹ m⁻¹ or less, 7.5×10⁸ N A⁻¹ m⁻¹ or less, 5×10⁸ N A⁻¹ m⁻¹ or less, 2.5×10⁸ N A⁻¹ m⁻¹ or less, 1×10⁸ N A⁻¹ m⁻¹ or less, 7.5×10⁷ N A⁻¹ m⁻¹ or less, 5×10⁷ N A⁻¹ m⁻¹ or less, 2.5×10⁷ N A⁻¹ m⁻¹ or less, 1×10⁷ N A⁻¹ m⁻¹ or less, 7.5×10⁶ N A⁻¹ m⁻¹ or less, 5×10⁶ N A⁻¹ m⁻¹ or less, 2.5×10⁶ N A⁻¹ m⁻¹ or less, 1×10⁶ N A⁻¹ m⁻¹ or less, 7.5×10⁵ N A⁻¹ m⁻¹ or less, 5×10⁵ N A⁻¹ m⁻¹ or less, 2.5×10⁵ N A⁻¹ m⁻¹ or less, 1×10⁵ N A⁻¹ m⁻¹ or less, 7.5×10⁴ N A⁻¹ m⁻¹ or less, 5×10⁴ N A⁻¹ m⁻¹ or less, 2.5×10⁴ N A⁻¹ m⁻¹ or less, 1×10⁴ N A⁻¹ m⁻¹ or less, 7.5×10³ N A⁻¹ m⁻¹ or less, 5×10³ N A⁻¹ m⁻¹ or less, 2.5×10³ N A⁻¹ m⁻¹ or less, 1×10³ N A⁻¹ m⁻¹ or less, 7.5×10² N A⁻¹ m⁻¹ or less, 5×10² N A⁻¹ m⁻¹ or less, 2.5×10² N A⁻¹ m⁻¹ or less, 1×10² N A⁻¹ m⁻¹ or less, 90 N A⁻¹ m⁻¹ or less, 80 N A⁻¹ m⁻¹ or less, 70 N A⁻¹ m⁻¹ or less, 60 N A⁻¹ m⁻¹ or less, 50 N A⁻¹ m⁻¹ or less, 40 N A⁻¹ m⁻¹ or less, 30 N A⁻¹ m⁻¹ or less, 20 N A⁻¹ m⁻¹ or less, 10 N A⁻¹ m⁻¹ or less, 5 N A⁻¹ m⁻¹ or less, 0 N A⁻¹ m⁻¹ or less, or −5 N A⁻¹ m⁻¹ or less).

In some examples, the layered Heusler alloy has a $\mu_0 H_{eff}$ of from −10 to 10¹⁰ N A⁻¹ m⁻¹ (e.g., from −10 N A⁻¹ m⁻¹ to 1×10⁵ N A⁻¹ m⁻¹, from 1×10⁵ N A⁻¹ m⁻¹ to 1×10¹⁰ N A⁻¹ m⁻¹, from −10 N A⁻¹ m⁻¹ to 1×10² N A⁻¹ m⁻¹, from 1×10² N A⁻¹ m⁻¹ to 1×10⁴ N A⁻¹ m⁻¹, from 1×10⁴ N A⁻¹ m⁻¹ to 1×10⁶ N A⁻¹ m⁻¹, from 1×10⁶ N A⁻¹ m⁻¹ to 1×10⁸ N A⁻¹ m⁻¹, from 1×10⁸ N A⁻¹ m⁻¹ to 1×10¹⁰ N A⁻¹ m⁻¹, or from 0 N A⁻¹ m⁻¹ to 1×10¹⁰ N A⁻¹ m⁻¹). In some examples, the magnetocrystalline anisotropy of the layered Heusler alloy is large enough to overcome a demagnetization field of a thin film. In some examples, the layered Heusler alloy has a $\mu_0 H_{eff}$ of greater than 0 N A⁻¹ m⁻¹.

In some examples, the layered Heusler alloys described herein can have high spin polarization at the Fermi energy, low damping, low resistivity, high spin-torque efficiency, high tunneling magnetoresistance, or a combination thereof. In some examples, the layered Heusler alloys described herein can be compatible with Heusler semiconductors.

Methods of Making

The layered Heusler alloys described herein can be made, for example, by thin film processing techniques, such as sputtering, pulsed layer deposition, molecular beam epitaxy, evaporation, atomic layer deposition, or combinations thereof. In some examples, the layered Heusler alloys described herein can be made, for example, using equilibrium processing methods, such as arc melting, annealing, or combinations thereof.

Methods of Use

The layered Heusler alloys described herein can be used, for example, in spintronic devices, spin logic devices, spin valves, magnetic tunnel junctions, or a combination thereof.

In some examples, the layered Heusler alloys described herein can be used in Magnetoresistive random-access memory devices. Magnetoresistive random-access memory (MRAM) is a non-volatile random access-memory technology that uses magnetic storage elements to store data, unlike the electric charge or current flows used to store data in conventional RAM chip technologies.

In some examples, the layered Heusler alloys described herein can be used in spin-torque transfer devices, such as spin-transfer, torque-based logic devices that use spins and magnets for information processing. Spin-torque transfer is an effect in which the orientation of a magnetic layer can be modified using a spin-polarized current. Spin-torque transfer can be used to flip the active elements in magnetic random-access memory. Spin-torque transfer magnetic random-access memory (e.g., STT-RAM or STT-MRAM) has the advantages of lower power consumption and better scalability over conventional magnetoresistive random-access memory (MRAM) which uses magnetic fields to flip the active elements. Spin-torque transfer technology can combine lower current requirements and reduced cost in making MRAM devices. In some examples, the layered Heusler alloys described herein can form the free layer in a STT-RAM device. In some examples, the layered Heusler alloys described herein can form the reference (or pinned) layer in a STT-RAM device. In some examples, the layered Heusler alloys described herein can be used to form an all-Heusler magnetic tunnel junction, for example by layering a semiconducting Heusler alloy with a half-metallic Heusler alloy.

In some examples, the layered Heusler alloys can be used as the ferromagnetic free layer in spin memory devices.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

Certain full-Heusler alloys (Skaftouros S et al. *Phys. Rev. B*. 2013, 87, 024420; Galanakis I et al. *J. Phys. D: Appl. Phys.* 2006, 39, 765) and half-Heusler alloys (Galanakis I et al. *Phys. Rev. B.* 2008, 77, 214417; Kandpal H C et al. *J. Phys. D: Appl. Phys.* 2006, 39, 5) have been shown (e.g., by calculation) to be half-metals or "near" half-metals. A half-metal occurs when the Fermi energy falls in a gap for one of the spin-channels, but not for the other. Thus electron transport at the Fermi energy (if spin-flip scattering and spin mixing effects are ignored) is metallic for the channel without a gap and activated for the gapped channel. The gap in the full- and half-Heusler alloys can occur such that the number of filled bands below the gap is three times the number of atoms per formula unit (i.e. for an average of three electrons per atom). Full and half-Heusler alloys can have a gap at three bands per atom. A "near half metal," on the other hand, occurs when the Fermi energy falls slightly outside the gap for one of the spin channels (Munira K et al. *J. Appl. Phys.* 2014, 115, 17B731).

One drawback of Heusler alloys, for some applications, is that the symmetry of their $L2_1$ and $C1_b$ crystal structures can preclude uniaxial magnetocrystalline anisotropy. A uniaxial symmetry can be induced by a surface or an interface, for example when a thin layer of Heusler alloy has an interface with MgO (Munira K et al. *J. Appl. Phys.* 2014, 115, 17B731; Wen Z et al. *Appl. Phys. Lett.* 2011, 98, 242507) or GaAs (Wang W H et al. *Phys. Rev. B.* 2005, 71, 144416). However, such an induced magnetocrystalline anisotropy is proportional to the area of the interface rather than the volume of the alloy. If this interfacial anisotropy is perpendicular, it will eventually be counterbalanced by the demagnetization anisotropy as the thickness of the Heusler alloy is increased. One possible exception would be a ferrimagnetic Heusler alloy with zero net magnetic moment.

Herein, ab-initio simulations demonstrate that an intrinsic uniaxial anisotropy can be achieved by making layered superlattices of two Heusler alloys. Various full-full, full-half and half-half Heusler superlattices are studied and potential half-metallic superlattices with perpendicular magnetocrystalline anisotropy are identified. This uniaxial anisotropy in the superlattice can be caused by the different electronic configurations of the two Heusler alloys and/or by the distortion of the lattice, which can cause the local environment of each atom to be different in the direction perpendicular to the layers from that in the plane of the layers.

Previous theoretical calculations have shown that it is possible for half-metallic Heusler superlattices comprising multiple Heusler alloys layered perpendicular to the [001] direction to retain their half-metallicity (Culbert C A et al. *J. Appl. Phys.* 2008, 103, 07D707; Tirpanci S et al. *J. Appl. Phys.* 2013, 113, 043912; Liu C et al. arXiv:1103.3855, 2011). Herein, the possibility of Heusler alloys layered perpendicular to the [110] and [111] directions retaining half-metallicity is investigated. In addition, the effects of symmetry reduction due to said layering is investigated, particularly with respect to magnetocrystalline anisotropy. The identification of Heusler superlattices that are half-metallic and also have sufficient perpendicular magnetic anisotropy to off-set the demagnetization field of a thin ferromagnetic layer that might occur, for example, in the ferromagnetic layers of an Spin-Torque Transfer Random Access Memory (STT-RAM) device (Apalkov D et al. *J. Emerg. Technol. Comput. Syst.* 2013, 9, 2), is discussed herein.

Layering in the [001] Direction

Figure 2:
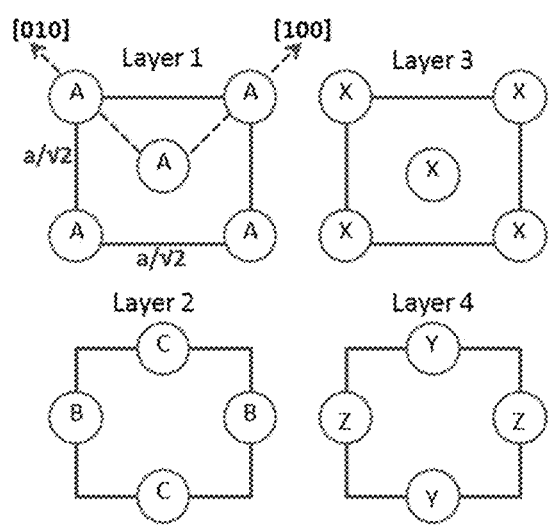
FIG. 2 displays a schematic representation of stacking in the [001] direction for full Heusler superlattice A$_2$BC-X$_2$YZ. The [100] and [010] directions indicated in the figure correspond to those in the fcc cell in FIG. 1A.

In bulk full-Heusler alloys, $A_2$ and BC planes are stacked alternately along the [001] direction. For half-Heuslers, A and BC planes alternate. For both alloy types, four of these atomic layers stacked along the [001] direction are needed to complete a supercell with the correct symmetry for all atoms. FIG. 2 illustrates the unit cell of a superlattice with layers stacked along the [001] direction and composed of two full-Heusler alloys, $A_2BC$ and $X_2YZ$. This unit cell corresponds to n=0.5 layering (in the terminology of Tirpanci S et al. *J. Appl. Phys.* 2013, 113, 043912), for which layers of each Heusler alloy alternate one after another, with each Heusler alloy having two layers. In other words, the unit cell for the Heusler superlattice comprising two full-Heusler alloys, namely $A_2BC$ and $X_2YZ$, would comprise a first layer populated by A atoms, followed by a second layer populated by B and C atoms, a third layer populated by X atoms, and a fourth layer populated by Y and Z atoms. Thus, an n=0.5 superlattice comprising two full-Heusler alloys can be described by . . . -$A_2$-BC-$X_2$-ZY- . . . where "ZY" (rather than "YZ") indicates that the positions of the transition and non-transition metal have been interchanged between the second and fourth layers. As used herein, this stacking is also referred to as "two layer stacking," indicating there are two atomic layers per Heusler alloy in the super lattice. For half-Heusler superlattices, the second and fourth layers are the same, but one of the two atomic sites in layers 1 and 3 that would have been occupied by an A or X atom in the full-Heusler is vacant, with the positions of the atom and vacancy alternating between layers 1 and 3.

Two layer stacking is called n=0.5 because the representation of a pure full-Heusler with cubic symmetry requires a supercell with 4 atomic [001] layers. When the number of layers for each constituent alloy is doubled (e.g., four layer stacking), the resulting superlattice will be said have n=1.0 layers (e.g., . . . -$A_2$-BC-$A_2$-CB-$X_2$-YZ-$X_2$-ZY- . . . ). Similarly, n=1.5 corresponds to 6 layers each of $A_2BC$ and $X_2YZ$ ( . . . -$A_2$-BC-$A_2$-CB-$A_2$-BC-$X_2$-ZY-$X_2$-YX-$X_2$-ZY- . . . ).

Layering in the [110] Direction

When the superlattice is formed by stacking layers along the [110] direction, each layer is stoichiometric. As shown in FIG. 3, A, B and C atoms are present in each layer. The unit cell in FIG. 3 corresponds to n=0.5 layering of a full-Heusler alloy, for which one layer of each constituent alternates one after another ( . . . -$A_2$BC-$X_2$YZ- . . . ). For n=1 and n=1.5, the thickness of each constituent of the superlattice is increased by 2 ( . . . -$A_2$BC-$A_2$BC-$X_2$YZ-$X_2$YZ- . . . ) and 3 times ( . . . -$A_2$BC-$A_2$BC-$A_2$BC-$X_2$YZ-$X_2$YZ-$X_2$YZ- . . . ), respectively.

For a half-Heusler, one of the A atoms in the $A_2BC$ layer and one of the X atoms in the $X_2YZ$ layer would be replaced by a vacancy. For the half-Heusler superlattice, n=0.5, 1.0 and 1.5 layering corresponds to ( . . . -ABC-XYZ- . . . ), ( . . . -ABC-ABC-XYZ-XYZ- . . . ) and ( . . . -ABC-ABC-ABC-XYZ-XYZ-XYZ- . . . ), respectively. Symmetry does not allow perpendicular magnetic anisotropy for Heusler superlattices stacked in the [110] direction for n=0.5 if A=X or if B=Y and C=Z, because, in such cases, the superlattice is geometrically equivalent in the [110] and [1$\bar{1}$0] directions. Systems with this degeneracy are omitted from Table 3.

As described in more detail below, the results of the investigations discussed herein indicate that (110) textured Heuslers and half-Heuslers can retain their half-metallicity. In this context "textured" means that the film is growing in such a manner that the atomic planes parallel to the plane of the film are perpendicular to the [110] direction. This may be useful in growing textured Heusler films. A full-Heusler alloy with random site occupation would be bcc. Alloys with bcc structure often prefer [110] growth because the atomic planes tend to be most dense for this growth direction. Denser planes that are further apart can lead to a lower surface energy. Herein, values of the formation energy per atom for the different layering directions and layer thicknesses were calculated in lieu of calculating surface energies.

Layering in the [111] Direction

Layering in the [111] direction comprises the stacking of hexagonal nets, as can be seen from the depiction of layers perpendicular to the [111] direction shown in FIG. 4. The fcc cells shown in FIGS. 1A and 1B are also helpful in understanding [111] layering. The fcc lattice with a single atom basis can be viewed along the [111] direction as a succession of identical hexagonal layers with the familiar A-B-C stacking. The $L2_1$ structure is fcc but with a 4 atom basis. There is a single species on each layer. For full-Heuslers with an $X_2YZ$ composition, the atomic layers perpendicular to the [111] direction follow the pattern of Y species on A, followed by X species on B, then Z species on C, X on A, Y on B, etc. The correct stoichiometry for a full-Heusler requires a minimum of 4 layers for each type of Heusler and the total number of repeating layers must be divisible by three to make the A-B-C sequence repeat. Thus for the case $A_2BC$-$X_2YZ$, a minimum of 12 layers is required for the simulation of a Heusler superlattice stacked in this manner. As shown in FIG. 4, there may be six layers of $A_2BC$ and then six layers of $X_2YZ$. One can also have 8 layers of $A_2BC$ followed by 4 layers of $X_2YZ$ or vice versa. Half-Heuslers do not contain any atoms in the second, sixth and tenth layers in the schematic structure of FIG. 4.

Computational Approach

Calculations were performed using the Vienna Ab-Initio Simulation Package (VASP) (Kresse G and Hafner J. *Phys. Rev. B.* 1993, 47, 558; Kresse G and Furthmüller J. *Phys. Rev. B.* 1996, 54, 11169) with the Perdew-Burke-Ernzerhof formulation of the generalized gradient approximation (GGA) (Wang Y and Perdew J P. *Phys. Rev. B.* 1991, 44, 13298) for the exchange-correlation potential. The superlattices were relaxed without any constraint on shape or volume, using the conjugate-gradient algorithm. A high kinetic energy cutoff of 520 electron volts (eV) was used during unit cell relaxation in order to guarantee accuracy and ensure that the calculated atomic forces are consistent with the energy(i.e., to ensure that the forces vanish at the energy minimum). The Brillouin zone sampling was performed according to the Monkhorst-Pack scheme. The Kohn-Sham equations were solved to find the charge distribution of the ground state system without taking spin-orbit interactions into account. Finally, the total energy of the system was calculated for a given orientation of magnetic moments in the presence of spin-orbit coupling.

Due to the spin-orbit interaction and the symmetry of the crystal, the magnetic moments of a material will want to point in a particular direction in an infinite or spherical crystal. Meanwhile, layered systems can have a special direction perpendicular to the layers. The difference in the energy per unit volume of the layered material when the moments are pointed perpendicular to the layers compared to the minimum energy when they point in the plane of the layers is the magnetocrystalline anisotropy, K (sometimes with a subscript "u", $K_u$). In other words, the magnetic anisotropy of a superlattice (K, sometimes with a subscript "u", $K_u$) is calculated by using the energy differences, $E_{in-plane}-E_{perpendicular}$. $E_{perpendicular}$ represents the energy when magnetization orientation is perpendicular to the stacking planes. $E_{in-plane}$ is the energy when magnetization orientation is along any direction in the stacking plane.

For [001]-stacked superlattices, the energy calculated for the [001] magnetization direction was compared to that calculated for the [1$\bar{1}$0] and [100] directions. For superlattices stacked in the [110] direction, the energy calculated for the [110] magnetization was compared to that calculated for the in-plane magnetization directions [001], [1$\bar{1}$0], and [$\bar{1}$11]. For superlattices stacked in the [111] direction, the energy calculated for the [111] magnetization was compared to that calculated for the in-plane magnetization directions [$\bar{1}\bar{1}$2] and [$\bar{1}$10]. A positive value for K indicates that the magnetization prefers to lie perpendicular to the Heusler planes, while a negative value indicates that the magnetization lies in-plane.

The formation energy per atom for the layered superlattice was calculated by subtracting the energies of the individual elements in pure form from the superlattice's total energy. For a layered n=0.5 $A_2BC-X_2YZ$ superlattice, the formation energy per atom ($E_{form}$) is:

$$E_{form} = \frac{(E_{A_2BC-X_2YZ} - 2E_A - E_B - E_C - 2E_X - E_Y - E_Z)}{8}$$

where $E_{A_2BC-X_2YZ}$ is the total energy of the superlattice unit cell containing 8 atoms (two A, one B, one C, two X, one Y and one Z), and $E_A$, $E_B$, $E_C$, $E_X$, $E_Y$, and $E_Z$ stand for the energies when each of the A, B, C, X, Y and Z elements crystallize in pure metals, respectively. If the formation energy per atom is positive, the superlattice is unstable and cannot be formed in equilibrium conditions. A negative formation energy per atom suggests that such a superlattice film can be grown. However, a negative formation energy does not, for example, guarantee against formation of binary or ternary phases comprising any two or three of the available six elements.

Results and Discussion

For this study, sixteen Heusler superlattices were simulated for layering perpendicular to the [001] and [110] directions and eight were simulated for layering perpendicular to the [111] direction. The 16 superlattices for the layered Heuslers are composed of 14 distinct full Heuslers and 7 distinct half-Heusler alloys. The bulk properties of these Heusler alloys are listed in Table 1. Individual Heusler alloys which are already experimentally realized are noted with a † sign. The alloys that have citations but no † signs are those for which theoretical predictions are available in the art, but not experimental confirmation. Compounds without citations are alloys that were found to have a negative formation energy herein, but for which no other experimental or theoretical reports were available.

The 21 Heusler alloys listed in Table 1 have gaps in the minority spin channel density of electronic states at 3 electrons per atom. This gap is referred to herein as the Slater-Pauling gap because Slater and Pauling noted in the 1930s that certain bcc-based alloys tend to maintain approximately three electrons per atom in the minority spin-channel. Table 1 also gives the calculated width of this gap. For some of the alloys, the Fermi energy is in (or is calculated to be in) this gap, generating a half-metal (e.g., $Co_2MnSi$, NiMnP) which are denoted by (HM) in the column of Table 1 that lists the width of the gap.

For three of the alloys listed in Table 1, namely $Fe_2TiSi$, $Fe_2TiGe$, and CoTiP, there is an average of 6 valence electrons per atom, such that it is possible to have a Slater-Pauling gap in both spin channels. The results of the calculations discussed herein indicated that these Heusler alloys have identical gaps in both channels. These alloys are denoted by (SC) adjacent to the gap width values in Table 1.

For CoTiSi, the Fermi energy is not in the gap, but is within 0.03 eV of falling in the gap. Herein, alloys whose Fermi energy falls outside the gap but within an energy distance from the gap of 0.05 eV are referred to as "near half-metals" and denoted by (NHM) in the column with the gap width values in Table 1. For five of the alloys in Table I, the Fermi energy falls outside of the gap and is further than 0.05 eV from the gap. Even though these alloys are not predicted to be half-metals or near half-metals as bulk alloys, they can be used in certain layered systems to make near half-metal or half-metal superlattices.

The column in Table 1 labeled "Distance from $E_F$ to gap" gives the distance (in eV) from the Fermi energy to the gap edge. Thus, for the half-metals, it gives the distance to the nearest band edge and the notation in parentheses indicates whether the nearest band edge is the conduction band (CB) or the valence band (VB). For some applications of half-metals, it can be desirable to have the Fermi energy as far from a band edge as possible. For the alloys that are not predicted to be half-metals, the number in the "Distance from $E_F$ to gap" column gives the energy difference between the Fermi energy and the closest band edge, and the notation in parentheses tells whether the Fermi energy falls below (VB) or above (CB) the gap. For some applications it might be desirable for this energy distance to be small, e.g. to make it easier to use alloying or electrochemical potentials to move the Fermi energy into the gap.

TABLE 1

Lattice constants, magnetic moments, formation energies, and calculated energy gaps of 14 full-Heusler and 7 half-Heusler alloys.

| Heusler | Lattice constant a (Å) | Magnetic moment per unit cell (μB) | Formation energy per atom (eV) | Gap Width* (eV) | Distance from EF to gap (eV) | Curie temperature (K) |
|---|---|---|---|---|---|---|
| $Co_2MnAl$† (Sakuraba Y et al. Appl. Phys. Lett. 2006, 88, 022503) | 5.71 | 4.009 | −0.349 | 0.477 | 0.149 (VB) | 950 (Kim K et al. Physica Status Solidi B. 2004, 241, 7) |
| $Fe_2MnAl$† (Ando Y et al Spintronics. ed Felser C and Fecher GH. Springer Netherlands, 2013, p. 355-366) | 5.67 | 2.002 | −0.183 | 0.376 | 0.0886 (VB) | 400 (Vinesh A et al. J. Appl. Phys. 2009, 105, 07A309) |
| $Fe_2MnGa$† | 5.69 | 2.0145 | −0.067 | 0.083 | 0.2374 | 750 |

TABLE 1-continued

Lattice constants, magnetic moments, formation energies, and
calculated energy gaps of 14 full-Heusler and 7 half-Heusler alloys.

| Heusler | Lattice constant a (Å) | Magnetic moment per unit cell (μB) | Formation energy per atom (eV) | Gap Width* (eV) | Distance from EF to gap (eV) | Curie temperature (K) |
|---|---|---|---|---|---|---|
| (Kudryavtsev YV et al. *Acta Materialia* 2012, 60, 12; Gasi T et al. *J. Appl. Phys.* 2013, 113, 17E301) | | | | | (VB) | (Gasi T et al. *J Appl. Phys.* 2013, 113, 17E301) |
| CO$_2$MnSi† (Picozzi S et al. *Phys. Rev. B.* 2004, 69, 094423; Kammerer S et al. *Appl. Phys. Lett.* 2004, 85, 79) | 5.63 | 5 | −0.433 | 0.669 (HM) | 0.310 (VB) | 985 (Sakuraba Y et al. *Appl. Phys. Lett.* 2006, 88, 192508) |
| Fe$_2$MnSi (Mori H et al. *Thin Solid Films*. 2012, 520, 15; Hamad B and Hu Q. *Physica Status Solidi* (b). 2011, 248, 12) | 5.56 | 3 | −0.332 | 0.405 | 0.067 (VB) | 215 (Brown PJ et al. *J. Magnetism and Magnetic Mater.* 1985, 50, 2) |
| CO$_2$FeSi† (Kandpal HC et al. *Phys. Rev. B.* 2006, 73, 094422; Inomata K et al. *J. Phys. D: Appl. Phys.* 2006, 39, 816) | 5.66 | 5.4642 | −0.349 | 0.040 | 0.628 (CB) | 1100 (Wurmehl S et al. *Phys. Rev B.* 2005, 72, 184434) |
| Fe$_2$TiSi† (Meinert M et al. *Phys. Rev. B.* 2014, 90, 085127) | 5.69 | 0 | −0.666 | 0.32 (SC) | — | — |
| Co$_2$VGa† (Han H et al. *J. Phys. D: Appl. Phys.* 2012, 111, 9; Kanomata T et al. *Phys. Rev. B.* 2010, 82, 144415) | 5.76 | 2 | −0.277 | 0.14 (HM) | 0.025 (CB) | 369 (Kubler J et al. *Phys. Rev. B.* 2007, 76, 024414) |
| Co$_2$VSn (Mahmoud NT et al. *Intermetallics*. 2013, 33, 0) | 6.07 | 3 | −0.041 | 0.376 (HM) | 0.093 (CB) | 103 (Kubler J et al. *Phys. Rev. B.* 2007, 76, 024414) |
| CO$_2$TiGe† (Prathiba G et al. *J. Magnetism and Magnetic Mater.* 2011, 323, 1) | 5.84 | 2 | −0.470 | 0.425 (HM) | 0.0813 (CB) | 380 (Barth J et al. *Phil. Trans. R. Soc. A.* 2011, 369, 3588) |
| Fe$_2$TiGe (Luo H et al. *J. Magnetism and Magnetic Mater.* 2012, 324, 20) | 5.78 | 0 | −0.452 | 0.1 (SC) | — | — |
| Co$_2$MnSb (Huang HM et al. *Physica B: Condensed Matter.* 2011, 406, 8) | 6.02 | 6 | −0.069 | 0.486 (HM) | 0.063 (CB) | 600 (Manea AS et al. *J. Crystal Growth*. 2005, 205, 1) |
| Co$_2$CrSb (Kanbur U and Gokoglu G. *J. Magnetism and Magnetic Mater.* 2011, 323, 9) | 6.01 | 5 | 0.066 | 0.385 (HM) | 0.088 (CB) | — |
| CO$_2$CrSi (Rai DP et al. *Bull. Mater. Sci.* 2011, 34, 6) | 5.66 | 4 | −0.305 | 0.682 (HM) | 0.3336 (VB) | 747 (Chen XW et al. *J. Appl. Phys.* 2006, 100, 113901) |
| CoMnP (Fujii S et al. *J. Phys. F: Metal Phys.* 1988, 18, 5) | 5.34 | 3 | −0.325 | 1.1 (HM) | 0.493 (CB) | 583 (Fruchart R et al. *J. Appl. Phys.* 1969, 40, 1250) |
| CoTiP | 5.43 | 0 | −0.988 | 1.37 (SC) | — | — |
| RhFeGe | 5.77 | 3 | −0.128 | 0.46 (HM) | 0.077 (CB) | — |
| RuMnAs (Antonov VN et al. *Phys. Rev. B.* 1997, 56, 20) | 5.76 | 2 | −0.032 | 0.78 (HM) | 0.012 (VB) | — |
| NiMnSi (Galanakis I et al. *J. Appl. Phys.* 2008, 104, 083916) | 5.43 | 3 | −0.139 | 0.87 (HM) | 0.325 (VB) | 715 (Dinh VA et al. *J. Phys. Soc. Jpn.* 2008, 77, 014705) |
| NiMnP (Singh M et al. *AIP Conf. Proceed.*. 2011, 1393, 1) | 5.46 | 4 | −0.193 | 0.89 (HM) | 0.302 (CB) | 1050 (Dinh VA et al. *J. Phys. Soc. Jpn.* 2008, 77, 014705) |
| CoTiSi (Kawaharada Y et al. *J. Alloys and Compounds*. 2004, 384, 1) | 5.58 | 0.998 | −0.561 | 1.16 (NHM) | 0.0291 (VB) | — |

*In column "Gap Width": NHM indicates a nearly half-metallic alloy with Fermi level within 0.05 eV of the bandgap. HM indicates a half-metallic superlattice with the Fermi level inside the band gap. SC indicates that the material is predicted to be a semiconductor with a Slater-Pauling gap in both spin-channels.

The results of calculations of the properties of certain layered Heusler alloys for layering in the [001], [110], and [111] directions are listed in Tables 2, 3, and 4, respectively. Generally, the Slater-Pauling gaps were found to be robust. The size of the gap in the multi-layer and its position relative to the Fermi energy varies with the direction of layering and with the thickness of the layers. In general, the results indicated the gap width for the layered Heusler will be between those of the individual Heuslers that comprise the layered Heusler system. Similarly, the results indicated that layering half-metals generally yields half-metallic multilayers.

One exception to these general trends is the layered system Co$_2$TiGe—Fe$_2$TiGe [001] n=0.5. The parent alloys are a Slater-Pauling half-metal (CO$_2$TiGe) and a Slater-Pauling semiconductor (Fe$_2$TiGe), respectively. The results of the calculations indicated the layered structure was a half-metal for [001] n=1.0 and n=1.5 layering, but not for n=0.5. This can be due to the nature of the semiconductor Fe$_2$TiGe, which is predicted to be a non-magnetic semiconductor despite being 50% Fe. The energy reduction achieved by making a Slater-Pauling semiconductor can be sufficient to "kill" the magnetic moment of Fe. Other Heuslers which show this effect are Fe$_2$VAl and Fe$_2$TiSi. The results discussed herein suggest that it is more difficult, however, to kill the Fe moment when the Fe atoms have second neighbors that are Co, for example as occurs in Co$_2$TiGe—Fe$_2$TiGe [001] n=0.5, when the layers are extremely thin.

The results discussed herein indicate that layering of gapped Heuslers that are not half-metals or near-half-metals can, in some examples, move the Fermi energy closer to the gap or even into the gap. One example is a layered Heusler structure comprising $Co_2MnAl$ and $Fe_2MnAl$. Both of the parent alloys have Slater-Pauling gaps, but the Fermi energy falls at least 0.88 eV below the gap edge for both parent alloys. However, all of the layered $Co_2MnAl$—$Fe_2MnAl$ systems investigated herein had a Fermi energy closer to the gap edge than either of the parent alloys.

One strategy for moving the Fermi energy into the gap can be layering a Heusler that has its Fermi energy in the valence band with another Heusler that has its Fermi energy in the conduction band. An example of this is layering $Co_2MnAl$ with $Co_2FeSi$. The latter has a tiny gap that is far from the Fermi energy in DFT calculations, although it can be made into a half-metal by application of a sufficiently large U in a LDA+U calculation (Balke B et al. *Phys. Rev. B*. 2006, 74, 104405). However, $Co_2MnAl$—$Co_2FeSi$ can yield half-metals when layered in the [001], [110], or [111] directions.

Table 2 lists the geometric and magnetic properties of superlattice systems layered along the [001] direction for three different values of the constituent thicknesses as labeled by n. Since the x- and y-directions perpendicular to the layering direction, (z), are equivalent, these superlattices will have tetragonal symmetry after relaxation. For these systems, both the in-plane lattice constant, "a", and a ratio labeled "c/a" that indicates the degree of tetragonal distortion of the lattice, are reported. The c/a number is actually C/(2na), where C is the length of the supercell in the [001] direction. A value of c/a of 1.0000 indicates no tetragonal distortion. For most of the systems herein, this distortion was small.

The magnetocrystalline anisotropy (K) is calculated by taking the difference between the energy when magnetization is aligned in the [001] direction and the lowest energy in-plane. The direction of the magnetization when the energy is the lowest in-plane is indicated in the magnetocrystalline anisotropy column (K) in Table 2.

The effective anisotropy field of a thin magnetic film, $H_{eff}$ (or, $\mu_0 H_{eff}$ where $\mu_0$ is the magnetic permeability constant), can be described by:

$$\mu_0 H_{eff} = \frac{2K - M_s^2}{M_s}$$

where $\mu_0$ is the magnetic permeability constant, K is the magnetocrystalline anisotropy, and $M_s$ is the saturation magnetization of the magnetic film due to magnetic dipole interactions. Accordingly, a thin magnetic film with no magnetocrystalline anisotropy (K=0) will have an effective anisotropy field of $\mu_0 H_{eff} = -M_s$. Even if K is greater than 0, $\mu_0 H_{eff}$ can be negative. A negative value of $\mu_0 H_{eff}$ indicates that the magnetic dipole interactions of the thin film are strong enough to pull the magnetic moment directions into the plane of the film. Conversely, a positive value of $\mu_0 H_{eff}$, for example as shown in Table 2, can indicate that the Heusler superlattice has enough perpendicular anisotropy to overcome the demagnetization field of a thin film.

TABLE 2

Lattice constants, c/a, magnetic moments and formation energies of various Heusler superlattices layered in [001] direction for three different thicknesses, n.

| Superlattice | n | Lattice constant a (Å) | c/a | Magnetic moment per unit cell ($\mu_B$) | K × 10⁵ (J/m³) | Formation energy per atom (eV) | $\mu_0 H_{eff}$ (N A⁻¹m⁻¹) | Gap Width (eV) | Distance from $E_f$ to gap (eV) |
|---|---|---|---|---|---|---|---|---|---|
| $Co_2MnAl$—$Fe_2MnAl$ | 0.5 | 5.70 | 0.9993 | 6.000 | 6.807 [1$\bar{1}$0] | −0.263 | 1.50 | 0.30 (NHM) | 0.015 (VB) |
|  | 1.0 | 5.68 | 1.0024 | 12.015 | −0.687 [1$\bar{1}$0] | −0.264 | −0.99 | 0.37 | 0.072 (VB) |
|  | 1.5 | 5.70 | 0.9973 | 18.039 | 1.253 [1$\bar{1}$0] | −0.266 | −0.35 | 0.31 | 0.087 (VB) |
| $Co_2MnAl$—$Co_2FeSi$ | 0.5 | 5.70 | 0.9921 | 10.000 | −1.646 [100] | −0.405 | −1.60 | 0.19 (HM) | 0.019 (CB) |
|  | 1.0 | 5.69 | 0.9935 | 20.000 | 0.105 [1$\bar{1}$0] | −0.392 | −1.26 | 0.23 (HM) | 0.067 (CB) |
|  | 1.5 | 5.73 | 0.9849 | 29.772 | −2.765 [1$\bar{1}$0] | −0.366 | −1.82 | 0.01 | 0.165 (CB) |
| $Co_2MnAl$—$Fe_2MnGa$ | 0.5 | 5.72 | 0.9964 | 6.013 | 7.175 [1$\bar{1}$0] | −0.205 | 1.64 | 0.11 | 0.124 (VB) |
|  | 0.5 | 5.72 | 1.0000 | 6.014 | 7.365 [1$\bar{1}$0] | −0.203 | 1.72 | 0.08 | 0.120 (VB) |
|  | 1.0 | 5.70 | 1.0020 | 12.086 | 1.275 [1$\bar{1}$0] | −0.208 | −0.34 | 0.10 | 0.169 (VB) |
|  | 1.5 | 5.71 | 0.9966 | 18.164 | 1.099 [1$\bar{1}$0] | −0.210 | −0.39 | 0.06 | 0.181 (VB) |
| $Co_2MnSi$—$Fe_2MnSi$ | 0.5 | 5.57 | 1.0056 | 8.013 | −2.940 [1$\bar{1}$0] | −0.379 | −1.76 | 0.33 | 0.065 (VB) |
|  | 1.0 | 5.57 | 1.0053 | 16.001 | −2.631 [100] | −0.379 | −1.46 | 0.51 (HM) | 0.095 (VB) |
|  | 1.5 | 5.57 | 1.0077 | 24.000 | −0.324 [1$\bar{1}$0] | −0.380 | −1.15 | 0.47 (HM) | 0.108 (VB) |
| $Co_2MnSi$—$Co_2FeSi$ | 0.5 | 5.60 | 1.0072 | 10.979 | −2.134 [1$\bar{1}$0] | −0.397 | −1.82 | 0.14 | 0.388 (CB) |
|  | 1.0 | 5.60 | 1.0033 | 21.598 | −1.027 [1$\bar{1}$0] | −0.394 | −1.61 | 0.28 | 0.244 (CB) |
|  | 1.5 | 5.61 | 1.0054 | 31.994 | −1.009 [1$\bar{1}$0] | −0.390 | −1.59 | 0.08 | 0.429 (CB) |
| $Co_2MnSi$—$Fe_2TiSi$ | 0.5 | 5.78 | 0.9688 | 5.000 | −0.280 [100] | −0.543 | −0.75 | 0.36 (HM) | 0.152 (VB) |
|  | 1.0 | 5.69 | 0.9915 | 10.000 | 0.118 [1$\bar{1}$0] | −0.550 | −0.60 | 0.42 (HM) | 0.172 (CB) |
|  | 1.5 | 5.67 | 0.9968 | 15.000 | −0.989 [100] | −0.557 | −1.03 | 0.41 (HM) | 0.194 (CB) |
| $Co_2VGa$—$Co_2VSn$ | 0.5 | 5.94 | 0.9875 | 5.000 | 0.520 [1$\bar{1}$0] | −0.211 | −0.34 | 0.26 (HM) | 0.028 (CB) |
|  | 1.0 | 5.90 | 0.9963 | 9.999 | 1.164 [100] | −0.180 | −0.06 | 0.31 (HM) | 0.072 (CB) |
|  | 1.5 | 6.00 | 0.9688 | 15.000 | 4.668 [100] | −0.157 | 1.47 | 0.23 (HM) | 0.012 (CB) |
| $Co_2TiGe$—$Fe_2TiGe$ | 0.5 | 5.72 | 1.0216 | 0.620 | 0.643 [1$\bar{1}$0] | −0.446 | 2.11 | No gap | — |
|  | 1.0 | 5.86 | 0.9868 | 4.000 | 3.421 [100] | −0.460 | 3.39 | 0.23 (HM) | 0.057 (CB) |
|  | 1.5 | 5.81 | 0.9725 | 5.996 | 2.246 [100] | −0.430 | 1.99 | 0.14 (HM) | 0.020 (CB) |
| $Co_2MnSb$—$Co_2CrSb$ | 0.5 | 6.04 | 0.9938 | 11.000 | 0.721 [1$\bar{1}$0] | −0.019 | −1.02 | 0.43 (HM) | 0.116 (CB) |
|  | 1.0 | 6.02 | 0.9981 | 22.000 | −0.109 [1$\bar{1}$0] | −0.017 | −1.20 | 0.43 (HM) | 0.083 (CB) |
|  | 1.5 | 6.02 | 0.9987 | 33.000 | −0.032 [1$\bar{1}$0] | −0.016 | −1.18 | 0.43 (HM) | 0.084 (CB) |
| $Co_2CrSi$—$Fe_2MnAl$ | 0.5 | 5.79 | 0.9637 | 6.000 | −0.641 [1$\bar{1}$0] | −0.298 | −0.98 | 0.42 (VB) | 0.112 (VB) |
|  | 1.0 | 5.68 | 0.9912 | 12.000 | −1.864 [1$\bar{1}$0] | −0.268 | −1.38 | 0.38 (HM) | 0.076 (VB) |
|  | 1.5 | 5.67 | 0.9956 | 18.000 | −1.647 [100] | −0.261 | −1.31 | 0.37 (HM) | 0.063 (VB) |

TABLE 2-continued

Lattice constants, c/a, magnetic moments and formation energies of various Heusler superlattices layered in [001] direction for three different thicknesses, n.

| Superlattice | n | Lattice constant a (Å) | c/a | Magnetic moment per unit cell ($\mu_B$) | K × 10⁵ (J/m³) | Formation energy per atom (eV) | $\mu_0 H_{eff}$ (N A$^{-1}$m$^{-1}$) | Gap Width (eV) | Distance from $E_f$ to gap (eV) |
|---|---|---|---|---|---|---|---|---|---|
| Co₂CrSi—Fe₂MnGa | 0.5 | 5.82 | 0.9581 | 6.000 | −2.199 [1$\bar{1}$0] | −0.237 | −1.49 | 0.33 (NHM) | 0.018 (VB) |
| | 1.0 | 5.71 | 0.9879 | 12.000 | −3.157 [1$\bar{1}$0] | −0.210 | −1.80 | 0.27 (NHM) | 0.037 (VB) |
| | 1.5 | 5.68 | 0.9937 | 18.012 | −2.833 [100] | −0.203 | −1.69 | 0.23 | 0.062 (VB) |
| Co₂CrSi—Fe₂MnSi | 0.5 | 5.69 | 0.9781 | 7.000 | 0.074 [100] | −0.333 | −0.90 | 0.48 (HM) | 0.136 (VB) |
| | 1.0 | 5.69 | 0.9772 | 14.000 | −0.427 [1$\bar{1}$0] | −0.329 | −1.04 | 0.48 (HM) | 0.111 (VB) |
| | 1.5 | 5.67 | 0.9823 | 21.000 | −0.097 [100] | −0.327 | −0.95 | 0.45 (HM) | 0.094 (VB) |
| CoMnP—CoTiP | 0.5 | 5.39 | 1.0049 | 3.000 | 3.106 [1$\bar{1}$0] | −0.740 | 1.33 | 1.32 (HM) | 0.594 (CB) |
| | 1.0 | 5.40 | 1.0012 | 6.000 | −1.326 [1$\bar{1}$0] | −0.754 | −1.19 | 1.32 (HM) | 0.595 (CB) |
| | 1.5 | 5.40 | 1.0025 | 9.000 | −1.333 [1$\bar{1}$0] | −0.761 | −1.20 | 1.33 (HM) | 0.604 (CB) |
| RhFeGe—RuMnAs | 0.5 | 5.79 | 1.0002 | 5.136 | −2.281 [1$\bar{1}$0] | −0.088 | −1.55 | 0.18 | 0.173 (VB) |
| | 1.0 | 5.78 | 1.0025 | 10.000 | −2.537 [100] | −0.095 | −1.66 | 0.48 (NHM) | 0.016 (VB) |
| | 1.5 | 5.77 | 1.0041 | 14.998 | −0.280 [100] | −0.096 | −0.72 | 0.41 (HM) | 0.023 (VB) |
| NiMnSi—NiMnP | 0.5 | 5.47 | 0.9959 | 7.000 | 0.303 [100] | −0.345 | −0.93 | 0.84 (HM) | 0.409 (VB) |
| | 1.0 | 5.47 | 0.9981 | 14.000 | −0.369 [100] | −0.343 | −1.09 | 0.82 (HM) | 0.404 (CB) |
| | 1.5 | 5.46 | 1.0005 | 21.000 | 0.496 [1$\bar{1}$0] | −0.340 | −0.88 | 0.77 (HM) | 0.369 (CB) |
| Co₂MnSi—CoTiSi | 0.5 | 5.63 | 0.9867 | 4.015 | −7.817 [1$\bar{1}$0] | −0.509 | −4.19 | 0.04 | 0.136 (VB) |
| | 0.5 | 5.63 | 1.0000 | 4.081 | −1.692 [100] | −0.468 | −1.33 | No gap | — |
| | 1.0 | 5.62 | 0.9897 | 8.067 | −3.945 [1$\bar{1}$0] | −0.537 | −2.37 | 0.26 | 0.082 (VB) |
| | 1.5 | 5.61 | 0.9935 | 12.267 | −1.366 [110] | −0.528 | −1.17 | 0.17 | 0.135 (VB) |

In Table 3, the analogous properties for layering along the [110] direction are presented. A [110] layered Heusler alloy can be represented by a supercell with 2 atomic layers. Thus for [110] layering, n=0.5 would represent alternating layers $A_2BC$-$X_2YZ$.

For a [110]-layered superlattice with n=0.5, the [1$\bar{1}$0] (in-plane) direction can be geometrically equivalent to the [110] (perpendicular) direction in certain cases, i.e. for A=X, or for B=Y and C=Z. Thus, for these cases, perpendicular magnetocrystalline anisotropy can only be obtained for layer thicknesses of n=1 or greater. As such, n=0.5 layering for [110] was not calculated herein for these cases.

For [110] layering, both c/a and c/b are reported. Both of these columns have been adjusted so that layering of two Heusler alloys with identical lattice constants and no distortions would yield c/a=c/b=1.0000. Thus, the reported c/a is actually cV/(na) and c/b is actually 2C/(nb), where C is the dimension of the superlattice in the direction of layering.

The results discussed herein indicate that the gaps are generally slightly larger for [110] layering than for [001] layering. Furthermore, when the Fermi energy falls outside the gap, the [110] layered systems tend to have the Fermi energy closer to the gap than the corresponding [001] layered systems.

Layering in the [110] direction offers the opportunity for magnetic anisotropy in the plane of the layers as well as for a difference between the energy between the in-plane and perpendicular directions. The direction for which the lowest energy was found is indicated in Table 3.

TABLE 3

Summary of the geometric and magnetic properties of various Heusler superlattices for three different thicknesses n, layering in [110] direction.

| Superlattice | n | Lattice constant a (Å) | c/a | c/b | Magnetic moment per unit cell ($\mu_B$) | K × 10⁵ (J/m³) | Formation energy per atom (eV) | $\mu_0 H_{eff}$ (N A$^{-1}$m$^{-1}$) | Gap Width (eV) | Distance from $E_f$ to gap (eV) |
|---|---|---|---|---|---|---|---|---|---|---|
| Co₂MnAl—Fe₂MnAl | 1.0 | 5.71 | 0.9955 | 1.0012 | 12.001 | 1.654 [001] | −0.262 | −0.21 | 0.40 (NHM) | 0.046 (VB) |
| | 1.5 | 5.71 | 0.9941 | 1.0013 | 18.000 | 1.350 [001] | −0.258 | −0.31 | 0.37 (NHM) | 0.011 (VB) |
| Co₂MnAl—Co₂FeSi | 1.0 | 5.66 | 1.0007 | 0.9989 | 20.000 | −2.201 [1$\bar{1}$0] | −0.398 | −1.71 | 0.33 (HM) | 0.153 (CB) |
| | 1.5 | 5.66 | 1.0007 | 0.9989 | 29.999 | −3.029 [1$\bar{1}$0] | −0.389 | −1.87 | 0.22 (HM) | 0.013 (CB) |
| Co₂MnAl—Fe₂MnGa | 0.5 | 5.73 | 0.9921 | 0.9916 | 6.004 | −0.199 [1$\bar{1}$0] | −0.191 | −0.82 | 0.16 | 0.074 (VB) |
| | 1.0 | 5.73 | 0.9948 | 1.0013 | 12.057 | 1.540 [001] | −0.204 | −0.25 | 0.22 | 0.164 (VB) |
| | 1.5 | 5.73 | 0.9947 | 1.0013 | 18.045 | 1.159 [001] | −0.201 | −0.37 | 0.21 | 0.116 (VB) |
| Co2MnSi—Fe₂MnSi | 1.0 | 5.57 | 1.0079 | 0.9990 | 16.000 | −7.431 [1$\bar{1}$0] | −0.385 | −2.82 | 0.58 (HM) | 0.066 (VB) |
| | 1.5 | 5.56 | 1.0117 | 0.9994 | 24.000 | −4.901 [1$\bar{1}$0] | −0.387 | −2.22 | 0.59 (HM) | 0.108 (VB) |
| Co2MnSi—Co₂FeSi | 1.0 | 5.63 | 1.0009 | 1.0001 | 21.778 | −0.497 [1$\bar{1}$0] | −0.405 | −1.50 | 0.34 | 0.204 (CB) |
| | 1.5 | 5.63 | 1.0005 | 1.0001 | 32.357 | −0.092 [$\bar{1}$11] | −0.403 | −1.42 | 0.24 | 0.299 (CB) |
| Co₂MnSi—Fe₂TiSi | 0.5 | 5.66 | 1.0056 | 0.9958 | 5.000 | −1.193 [001] | −0.530 | −1.11 | 0.36 (HM) | 0.135 (VB) |
| | 1.0 | 5.64 | 1.0059 | 1.0026 | 10.000 | −0.096 [1$\bar{1}$0] | −0.543 | −0.68 | 0.50 (HM) | 0.194 (VB) |
| | 1.5 | 5.65 | 1.0038 | 1.0022 | 15.000 | −0.289 [1$\bar{1}$0] | −0.552 | −0.76 | 0.47 (HM) | 0.193 (VB) |
| Co₂VGa—Co₂VSn | 1.0 | 5.89 | 0.9983 | 1.0020 | 10.000 | 0.001 [001] | −0.210 | −0.57 | 0.30 (HM) | 0.041 (CB) |
| | 1.5 | 5.91 | 0.9963 | 1.0010 | 15.000 | −0.285 [001] | −0.209 | −0.63 | 0.28 (HM) | 0.045 (CB) |
| Co₂TiGe—Fe₂TiGe | 1.0 | 5.77 | 1.0107 | 0.9976 | 4.000 | −0.909 [1$\bar{1}$0] | −0.459 | −1.20 | 0.26 (HM) | 0.064 (VB) |
| | 1.5 | 5.79 | 1.0046 | 0.9974 | 6.000 | 0.455 [1$\bar{1}$0] | −0.460 | 0.24 | 0.24 (HM) | 0.095 (CB) |
| Co₂MnSb—Co₂CrSb | 1.0 | 6.02 | 0.9981 | 0.9997 | 21.998 | 1.149 [001] | −0.019 | −0.93 | 0.43 (HM) | 0.092 (CB) |
| | 1.5 | 6.01 | 0.9998 | 0.9996 | 33.000 | −0.308 [001] | −0.017 | −1.24 | 0.43 (HM) | 0.079 (CB) |

TABLE 3-continued

Summary of the geometric and magnetic properties of various Heusler superlattices for three different thicknesses n, layering in [110] direction.

| Superlattice | n | Lattice constant a (Å) | c/a | c/b | Magnetic moment per unit cell ($\mu_B$) | $K \times 10^5$ ($J/m^3$) | Formation energy per atom (eV) | $\mu_0 H_{eff}$ ($N\,A^{-1}m^{-1}$) | Gap Width (eV) | Distance from $E_f$ to gap (eV) |
|---|---|---|---|---|---|---|---|---|---|---|
| Co$_2$CrSi—Fe$_2$MnAl | 0.5 | 5.62 | 0.9979 | 1.0131 | 6.000 | −0.857 [001] | −0.282 | −1.05 | 0.48 (HM) | 0.083 (VB) |
| | 1.0 | 5.68 | 0.9939 | 0.9884 | 11.999 | −3.021 [001] | −0.275 | −1.75 | 0.45 (HM) | 0.054 (VB) |
| | 1.5 | 5.63 | 1.0048 | 0.9988 | 18.000 | −1.254 [001] | −0.269 | −1.18 | 0.41 (HM) | 0.097 (VB) |
| Co$_2$CrSi—Fe$_2$MnGa | 0.5 | 5.65 | 0.9930 | 1.0071 | 6.000 | −1.852 [001] | −0.216 | −0.77 | 0.31 (NHM) | 0.048 (VB) |
| | 1.0 | 5.68 | 0.9892 | 0.9883 | 12.000 | −3.615 [001] | −0.214 | −1.95 | 0.32 (NHM) | 0.035 (VB) |
| | 1.5 | 5.64 | 1.0036 | 0.9985 | 18.000 | −1.800 [001] | −0.208 | −1.36 | 0.26 (NHM) | 0.015 (VB) |
| Co$_2$CrSi—Fe$_2$MnSi | 0.5 | 5.55 | 1.0087 | 1.0209 | 7.000 | −0.840 [001] | −0.330 | −1.15 | 0.51 (HM) | 0.134 (VB) |
| | 1.0 | 5.58 | 1.0059 | 0.9971 | 14.000 | −1.653 [001] | −0.325 | −1.37 | 0.56 (HM) | 0.140 (VB) |
| | 1.5 | 5.54 | 1.0191 | 1.0016 | 21.000 | −2.409 [001] | −0.326 | −1.58 | 0.59 (HM) | 0.140 (VB) |
| CoMnP—CoTiP | 1.0 | 5.41 | 0.9997 | 0.9980 | 6.000 | −0.188 [001] | −0.747 | −0.55 | 1.35 (HM) | 0.561 (CB) |
| | 1.5 | 5.41 | 0.9976 | 0.9985 | 9.000 | 0.360 [001] | −0.720 | −0.24 | 1.32 (HM) | 0.624 (CB) |
| RhFeGe—RuMnAs | 0.5 | 5.76 | 1.0085 | 1.0054 | 5.069 | −5.910 [1$\bar{1}$0] | −0.093 | −3.05 | 0.17 | 0.265 (VB) |
| | 1.0 | 5.77 | 0.9999 | 0.9949 | 10.000 | 3.820 [$\bar{1}$11] | −0.100 | 0.99 | 0.47 (NHM) | 0.012 (VB) |
| | 1.5 | 5.78 | 1.0016 | 1.0011 | 15.001 | −2.234 [1$\bar{1}$0] | −0.099 | −1.53 | 0.43 (NHM) | 0.037 (VB) |
| NiMnSi—NiMnP | 1.0 | 5.45 | 1.0024 | 0.9983 | 14.000 | 0.409 [$\bar{1}$11] | −0.348 | −0.90 | 0.83 (HM) | 0.407 (CB) |
| | 1.5 | 5.45 | 1.0010 | 0.9980 | 21.000 | 0.026 [001] | −0.232 | −0.99 | 0.81 (HM) | 0.380 (VB) |
| Co$_2$MnSi—CoTiSi | 0.5 | 5.64 | 0.9846 | 0.9867 | 4.015 | 7.817 [001] | −0.509 | 3.11 | 0.04 | 0.136 (VB) |
| | 1.0 | 5.59 | 0.9921 | 0.9965 | 8.000 | 2.699 [001] | −0.553 | 0.72 | 0.49 (HM) | 0.125 (VB) |
| | 1.5 | 5.59 | 0.9968 | 0.9981 | 12.000 | 2.418 [001] | −0.552 | 0.59 | 0.47 (HM) | 0.083 (VB) |

Table 4 presents results for layering along the [111] direction for eight Heusler pairs for the minimal 12 layer geometry required to represent the full-Heusler alloy geometry. For [111] layering, each atomic layer is a relatively sparsely populated hexagonal net containing only a single species. The column labeled "Lattice constant" gives the in-plane nearest neighbor distance a multiplied by $\sqrt{2}$, which would correspond to the Heusler lattice constant for the pure Heusler system. The column labeled c/a lists the c-axis of the supercell divided by $\sqrt{6}a$, where a is the in-plane nearest neighbor distance. This ratio would be 1.000 for the cubic Heusler lattice. A value in this column greater than unity indicates that the lattice is stretched in [111] direction relative to the in-plane direction.

Three types of stacking within this twelve layer supercell were investigated: 8-4, meaning 8 layers of Heusler 1 followed by 4 layers of Heusler 2; 4-8, meaning 4 layers of Heusler 1 followed by 8 layers of Heusler 2; and 6-6, meaning 6 layers of Heusler 1 followed by 6 layers of Heusler 2.

TABLE 4

Summary of the geometric and magnetic properties of various Heusler superlattice, stacked in [111] direction. Heusler A$_2$BC is followed by layers of Heusler X$_2$YZ. For half-Heuslers, O represents a vacant layer.

| Superlattice | Stacking order | Lattice constant a (Å) | c/a | Magnetic moment per unit cell ($\mu_B$) | $K \times 10^5$ ($J/m^3$) | Formation Energy per atom (eV) | $\mu_0 H_{eff}$ ($N\,A^{-1}m^{-1}$) | Gap Width (eV) | Distance from $E_f$ to gap (eV) |
|---|---|---|---|---|---|---|---|---|---|
| Co$_2$MnSi—Fe$_2$MnSi | BACABACAYXZX | 5.61 | 1.0035 | 13.000 | −3.924 [$\bar{1}\bar{1}$2] | −0.404 | −2.01 | 0.62 (HM) | 0.084 (VB) |
| | BACABAZXYXZX | 5.61 | 1.0022 | 12.000 | −5.770 [1$\bar{1}$0] | −0.385 | −2.43 | 0.62 (HM) | 0.123 (VB) |
| | YXZXYXZXBACA | 5.60 | 1.0012 | 11.000 | −5.091 [$\bar{1}\bar{1}$2] | −0.370 | −2.29 | 0.60 (HM) | 0.080 (VB) |
| Co$_2$MnAl—Fe$_2$MnAl | BACABACAYXZX | 5.69 | 1.0201 | 10.022 | 1.602 [$\bar{1}\bar{1}$2] | −0.292 | −0.36 | 0.45 | 0.085 (CB) |
| | BACABAZXYXZX | 5.69 | 1.0183 | 9.000 | 1.230 [1$\bar{1}$0] | −0.262 | −0.35 | 0.39 (NHM) | 0.017 (CB) |
| | YXZXYXZXBACA | 5.68 | 1.0180 | 8.005 | 1.011 [1$\bar{1}$0] | −0.234 | −0.30 | 0.42 | 0.055 (CB) |
| Co$_2$MnAl—Co$_2$FeSi | BACABACAYXZX | 5.68 | 1.0155 | 14.000 | −0.221 [1$\bar{1}$0] | −0.390 | −1.24 | 0.43 (HM) | 0.068 (VB) |
| | BACABAZXYXZX | 5.66 | 1.0116 | 15.000 | −1.011 [$\bar{1}\bar{1}$2] | −0.407 | −1.48 | 0.42 (HM) | 0.187 (CB) |
| | YXZXYXZXBACA | 5.66 | 1.0123 | 15.880 | −1.160 [1$\bar{1}$0] | −0.390 | −1.57 | 0.25 | 0.161 (VB) |
| | YXZXYXCABACA | 5.68 | 1.0165 | 15.000 | −2.206 [1$\bar{1}$0] | −0.382 | −1.71 | 0.24 (HM) | 0.086 (CB) |
| Co$_2$MnAl—Fe$_2$MnGa | BACABACAYXZX | 5.70 | 1.0218 | 10.060 | 3.060 [1$\bar{1}$0] | −0.255 | 0.07 | 0.35 | 0.148 (CB) |
| | BACABAZXYXZX | 5.71 | 1.0212 | 9.015 | 1.800 [$\bar{1}\bar{1}$2] | −0.186 | −0.15 | 0.20 | 0.145 (CB) |
| | YXZXYXZXBACA | 5.70 | 1.0213 | 8.076 | 2.303 [$\bar{1}\bar{1}$2] | −0.160 | 0.18 | 0.21 | 0.188 (CB) |
| | YXZXYXCABACA | 5.70 | 1.0197 | 9.002 | 1.244 [1$\bar{1}$0] | −0.225 | −0.34 | 0.31 | 0.075 (CB) |
| Co$_2$MnSi—Fe$_2$TiSi | BACABACAYXZX | 5.65 | 1.0002 | 10.000 | −0.529 [1$\bar{1}$0] | −0.504 | −1.02 | 0.59 (HM) | 0.244 (VB) |
| | BACABAZXYXZX | 5.64 | 0.9998 | 9.000 | −1.361 [$\bar{1}\bar{1}$2] | −0.497 | −1.22 | 0.59 (HM) | 0.161 (VB) |
| | YXZXYXZXBACA | 5.67 | 1.0037 | 5.000 | −2.456 [1$\bar{1}$0] | −0.585 | −1.87 | 0.48 (HM) | 0.169 (VB) |
| | YXZXYXCABACA | 5.68 | 1.0057 | 6.000 | −2.487 [$\bar{1}\bar{1}$2] | −0.594 | −1.74 | 0.52 (HM) | 0.124 (VB) |
| Co$_2$MnSi—Co$_2$FeSi | BACABACAYXZX | 5.63 | 0.9994 | 15.998 | −0.301 [$\bar{1}\bar{1}$2] | −0.418 | −1.44 | 0.46 (NHM) | 0.013 (VB) |
| | YXZXYXZX-BACA | 5.63 | 0.9987 | 16.401 | −0.206 [$\bar{1}\bar{1}$2] | −0.388 | −1.46 | 0.24 | 0.357 (VB) |
| CoMnP—CoTiP | BOCABOCAYOZX | 5.39 | 0.9522 | 6.000 | 3.784 [$\bar{1}\bar{1}$2] | −0.452 | 1.00 | 1.39 (HM) | 0.693 (CB) |
| | YOZXYOCABOCA | 5.42 | 0.9578 | 3.000 | 5.019 [1$\bar{1}$0] | −0.624 | 4.01 | 1.39 (HM) | 0.576 (CB) |
| Co$_2$MnSi—CoTiSi | BACABACAYOZX | 5.60 | 0.9999 | 9.000 | 5.108 [$\bar{1}\bar{1}$2] | −0.506 | 0.81 | 0.73 (HM) | 0.361 (CB) |
| | YOZXYOZXBACA | 5.57 | 0.9905 | 3.000 | 5.457 [$\bar{1}\bar{1}$2] | −0.607 | 4.78 | 0.56 (HM) | 0.023 (VB) |

The magnetic anisotropy of a layered Heusler system (e.g., a Heusler superlattice) can stem from two factors: (1) the difference in the electronic system between the two Heuslers in the superlattice and (2) lattice distortion. Most of the Heusler superlattices discussed herein have a relatively small stretching or contraction in the stacking direction compared to the in-plane direction. Moreover, no strong or obvious correlation between the anisotropy and the lattice distortion was observed. These observations suggest that the induced magnetic anisotropy can be due to the difference in the electronic structure of the two Heusler constituents.

In order to test the hypothesis that the contrast in electronic structure can be more important for anisotropy than the changes in atomic positions, the electronic structure of two systems was recalculated for the ideal layered structure and compared the to the result for the relaxed layered structure. For $Co_2MnAl$—$Fe_2MnGa$, the effect of the distortion was small. The undistorted calculation is listed in Table 2 as the row with c/a=1.0000. On the other hand, for $Co_2MnSi$—$CoTiSi$, the relaxation seemed to be important both for the anisotropy and for the existence of the gap.

As discussed above, for some superlattices, even though the system has perpendicular anisotropy, the perpendicular anisotropy field is not strong enough to overcome the demagnetization field of a thin film (e.g., $Co_2MnAl$—$Fe_2MnAl$ with n=1.5 layering and [001] stacking, $Co_2MnAl$—$Fe_2MnGa$ with n=1.0 or 1.5 layering and [110] stacking).

The calculated magnetic anisotropy for the sixteen [001]-layered Heusler alloys is shown in Table 2. For each system, the anisotropy was calculated for n=0.5, 1.0 and 1.5. Sixteen of these 48 systems were found to have perpendicular anisotropy. Of these 16 with perpendicular anisotropy, 7 were found to have sufficient perpendicular anisotropy to exceed the thin film demagnetization field.

Figure 5A:
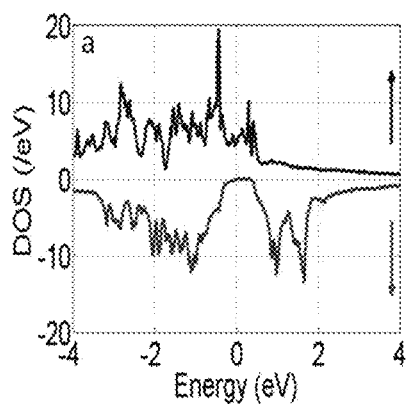
FIG. 5A displays the density of states for Co$_2$MnAl—Fe$_2$MnAl stacked in [001] direction with n=0.5 layering. This superlattice is a near half-metal with gap width of 0.30 eV.
Figure 5B:
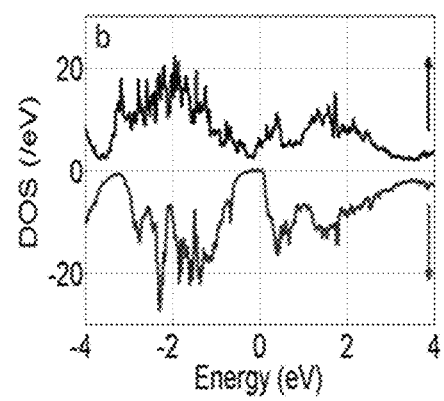
FIG. 5B displays the density of states for Co$_2$TiGe—Fe$_2$TiGe stacked in [001] direction with n=1.0 layering and gap width of 0.23 eV as a half-metal. The Fermi level is at 0 eV.

$Co_2MnAl$—$Fe_2MnAl$ with n=0.5 is predicted to be a near half-metal with perpendicular magnetic anisotropy; the density of states for this layered system is shown in FIG. 5A. $Co_2TiGe$—$Fe_2TiGe$ with n=1.0 is predicted to be a half-metal with perpendicular magnetic anisotropy; the density of states for this layered system is shown in FIG. 5B. CoMnP—CoTiP with n=0.5 is a layered combination of half-Heuslers that combines a relatively strong perpendicular anisotropy with wide band-gap half-metallicity. Interestingly, both $Fe_2TiGe$ and CoTiP are Slater-Pauling semiconductors.

Figure 6A:
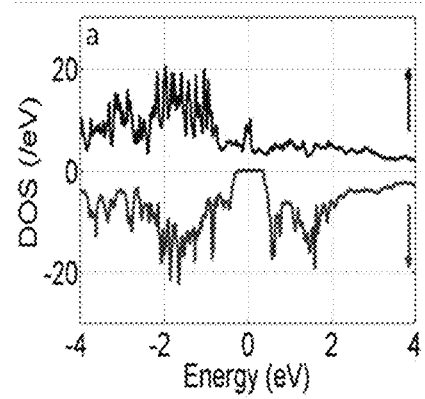
FIG. 6A displays the density of states for half-metallic Co$_2$MnSi—CoTiSi superlattice stacked in [110] direction, n=1 with a band gap of 0.49 eV.

For [110] layering, the same 16 Heusler combinations as for [001] layering were investigated. For some of the n=0.5 thickness systems with [110] layering, the [1$\bar{1}$0] direction is equivalent to the [110] direction. These systems cannot have perpendicular anisotropy in the [110] direction. This consideration reduces the number of systems to 39 compared to 48 for the [001] direction. Thirteen of the 39 [110] systems were found to have perpendicular magnetocrystalline anisotropy. Of the 13 with perpendicular magnetocrystalline anisotropy, 5 had sufficient perpendicular magnetic anisotropy to be perpendicular as a thin film. Of these 5 predicted to be perpendicular as a thin film, 3 were also half metals. The full-Heusler-half-Heusler combination, $Co_2MnSi$—CoTiSi with n=1 is predicted to have perpendicular magnetic anisotropy and to be a half-metal with a relatively large band gap. The density of states for this superlattice is shown in FIG. 6A.

Figure 6B:
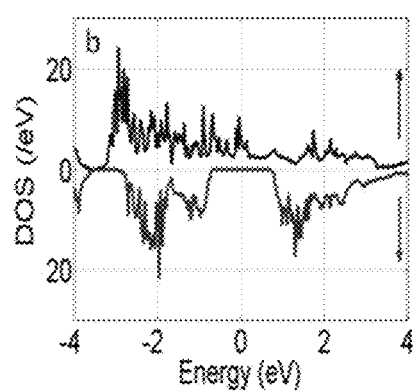
FIG. 6B displays the density of states for half-metallic CoMnP—CoTiP superlattice stacked in [111] direction with a big band gap of 1.35 eV. The Fermi level is at 0 eV.

For [111] layering we investigated 8 pairs of Heuslers. Even for a minimal 12 atomic layer supercell (9 atomic layers if both are half-Heuslers) there are several ways the layers can be arranged while still maintaining the local Heusler environment. In all we investigated 24 [111] layered systems. Of these 24, 11 were calculated to have perpendicular magnetic anisotropy and of the 11 with perpendicular magnetic anisotropy we calculated that 6 would be perpendicular as thin films. The sign of the magnetocrystalline anisotropy was consistent for all of the [111] layer schemes that we tried for a given pair of Heuslers. The [111] layered half-Heusler system CoMnP—CoTiP is predicted to be half metallic as well as perpendicular with a large band gap. The density of states for this superlattice is shown in FIG. 6B.

For some applications of half-metals, it can be desirable to have the Fermi energy fall near the center of the gap of the gapped spin-channel. Many of the half-metallic Heusler superlattices with perpendicular anisotropy investigated herein have a Fermi level close to the valence band edge (e.g., [001] direction stacked, n=0.5 superlattice of $Co_2MnAl$—$Fe_2MnAl$). The position of the Fermi level and the gap width can be engineered by doping the superlattice with atoms with a higher or lower count of valence electrons (Balke B et al. *Phys. Rev. B.* 2006, 74, 104405; Miura Y et al. *Phys. Rev. B.* 2004, 69, 144413; Antonov V N et al. *Phys. Rev. B.* 2005, 72, 054441).

Figure 7A:
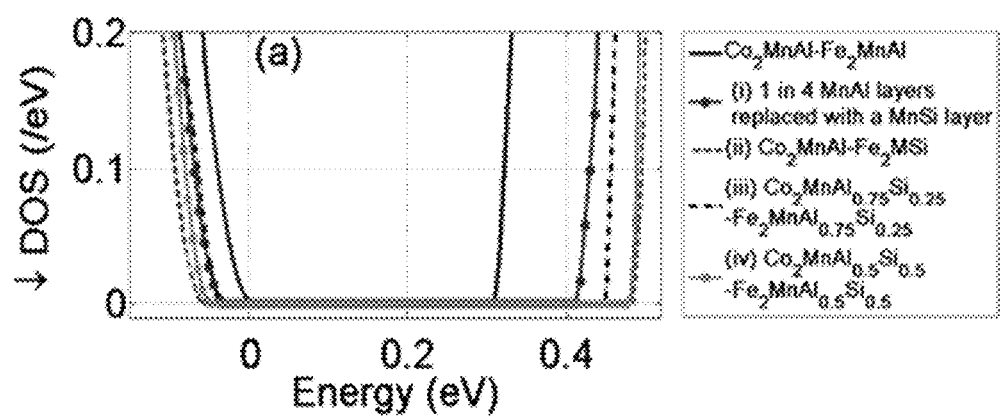
FIG. 7A displays the density of states for a [001] stacked superlattice of Co$_2$MnAl—Fe$_2$MnAl is doped with Si atoms at the Al atoms site. In cases (i) and (ii), Al and Si atoms are not mixed in a (001) plane. In cases (iii) and (iv), both Al and Si atoms can be there in a plane. When 50% of the Al are replaced with Si, the Fermi level moves 0.05 eV into the band gap, relative to the valence band edge.

In order to move the Fermi level away from the valence band edge toward the band gap in the [001] direction stacked n=0.5 superlattice of $Co_2MnAl$—$Fe_2MnAl$, the alloy was doped with Si atoms at the Al atom sites or with Cr atoms at the Mn sites to add electrons and thereby move the Fermi energy up relative to the gap. FIG. 7A shows the density of states of the [001] direction stacked superlattice of $Co_2MnAl$—$Fe_2MnAl$ with Si doping. For cases (i) and (ii), the Al and Si atoms were not mixed in a (001) plane. For case (i) one in every four Mn—Al atomic planes were replaced with Mn—Si planes ( . . . —$Co_2$—MnAl—$Fe_2$—MnAl—$Co_2$—MnAl—$Fe_2$—MnSi— . . . ). In case (ii), two of the Mn—Al planes were replaced with Mn—Si ( . . . —$Co_2$—MnAl—$Fe_2$—MnAl—$Co_2$—MnAl—$Fe_2$—MnSi— . . . ). For cases (iii) and (iv), both Al and Si atoms can be in a (001) plane.

For $Co_2MnAl$—$Fe_2MnAl$, the Fermi Level is 0.015 eV inside the valence band. In all cases of doping, addition of Si atoms shifted the Fermi level into the band gap. When 50% of the Al atoms were replaced with Si atoms (cases (ii) and (iv)), the Fermi level moved 0.05 eV into the band gap relative to the valence band edge. For 25% doping, the Fermi level moved 0.03 eV into the band gap. The improvement in half-metallicity came at the cost of the perpendicular anisotropy. For 25% Si doping at the Al sites, the anisotropy dropped from $6.08 \times 10^5$ J/m$^3$ to $5.02 \times 10^5$ J/m$^3$ and $4.8 \times 10^5$ J/m$^3$ for cases (i) and (iii), respectively. For 40% Si doping, the anisotropy dropped to $2.16 \times 10^5$ J/m$^3$ and $1.08 \times 10^5$ J/m$^3$ for cases (ii) and (iv), respectively.

Figure 7B:
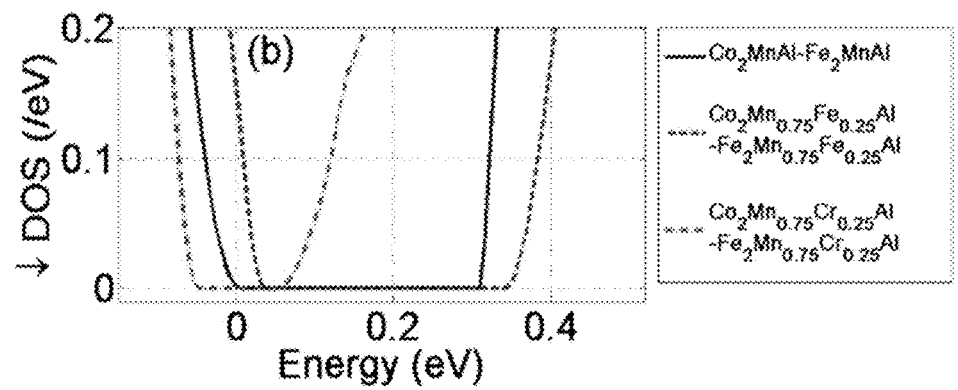
FIG. 7B displays the density of states for a Co$_2$MnAl—Fe$_2$MnAl superlattice doped with Fe and Cr atoms at the Mn atom site. Doping with Cr atoms move the Fermi level 0.05 eV into the band gap, but narrows the gap.

FIG. 7B shows the effect of Fe or Cr doping at the Mn atom sites. Addition of Fe atoms moved the Fermi level 0.043 eV into the valence band. Addition of Cr atoms placed the Fermi level in the middle of the band gap. However, the bandgap was reduced to 0.1 eV and the anisotropy dropped to $1.47 \times 10^5$ J/m$^3$.

One drawback of half-metallic Heusler alloys for application as ferromagnetic layers in certain spintronic devices is that they do not have uniaxial magnetocrystalline anisotropy. To address these and other issues, layered Heusler alloys were investigated by studying superlattices stacked in the [001], [110], or [111] directions for different thickness. The results indicate that two Heusler alloys stacked in the [001], [110], or [111] directions for various thicknesses to form a superlattice, can still satisfy the Slater-Pauling rule and the resulting superlattice can be half-metallic with gaps comparable to or larger than those of its constituents. The Slater-Pauling gaps characteristics of many L2$_1$ (full) and C1$_b$ (half) Heusler alloys were found to be robust in the presence of layering in the [001], [110], or [111] directions. This was found for L2$_1$-L2$_1$, L2$_1$-C1$_b$, and C1$_b$-C1$_b$ combinations. The results discussed herein also predicted that it is possible to achieve uniaxial anisotropy by layering two Heusler alloys and that said uniaxial magnetocrystalline anisotropy can be due to the differences in the electronic structure of the two Heuslers in the superlattice.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible examples may be made of the invention without departing from the scope thereof, it is to be understood that all matter herein set forth or shown in the accompanying drawings is to be interpreted as illustrative and not in a limiting sense.

What is claimed is:

1. A layered Heusler alloy, comprising:
   a first layer comprising a first Heusler alloy with a face-centered cubic (fcc) crystal structure;
   a second layer comprising a second Heusler alloy with a fcc crystal structure, the second Heusler alloy being different than the first Heusler alloy;
   wherein the first layer and the second layer are layered along a layering direction, the layering direction being the [110] or [111] direction of the fcc crystal structure, thereby forming the layered Heusler alloy;
   wherein the layered Heusler alloy has a magnetocrystalline anisotropy of greater than 0 J/m$^3$ along a direction perpendicular to the layering direction;
   wherein the layered Heusler alloy comprises a half metal or a near half metal; and
   wherein the layered Heusler alloy has a Fermi level and a gapped spin-channel with a gap, and wherein the Fermi level of the layered Heusler alloy falls within the gap of the gapped spin-channel of the layered Heusler alloy.

2. The layered Heusler alloy of claim 1, wherein:
   the layered Heusler alloy is layered along the [110] direction;
   the first Heusler alloy has a formula A$_p$BC, wherein:
     p is 1 or 2;
     A and B are each a transition metal, with the proviso that A and B are not the same transition metal; and
     C is an element from Group 13, 14, or 15;
   the first layer comprises a first number of sublayers;
   the second Heusler alloy has a formula X$_q$YZ, wherein:
     q is 1 or 2;
     X and Y are each a transition metal, with the proviso that X and Y are not the same transition metal; and
     Z is an element from Group 13, 14, or 15;
   the second layer comprises a second number of sublayers; and
   the first number of sublayers is the same as the second number of sublayers, such that the layered Heusler alloy has a unit cell comprising (A$_p$BC)a(X$_q$YZ)a, wherein a is the first number of sublayers and a is an integer from 1 to 1000.

3. The layered Heusler alloy of claim 2, wherein:
   A and B are selected from the group consisting of: scandium, titanium, vanadium, chromium, manganese, iron, cobalt, nickel, yttrium, zirconium, niobium, molybdenum, technetium, ruthenium, rhodium, and palladium; and
   X and Y are selected from the group consisting of: scandium, titanium, vanadium, chromium, manganese, iron, cobalt, nickel, yttrium, zirconium, niobium, molybdenum, technetium, ruthenium, rhodium, and palladium.

4. The layered Heusler alloy of claim 2, wherein:
   A and B are selected from the group consisting of: titanium, vanadium, chromium, manganese, iron, cobalt, nickel, rhodium, and palladium; and
   X and Y are selected from the group consisting of: titanium, vanadium, chromium, manganese, iron, cobalt, nickel, rhodium, and palladium.

5. The layered Heusler alloy of claim 2, wherein C and Z are independently selected from the group consisting of: boron, aluminum, gallium, indium, thallium, carbon, silicon, germanium, tin, lead, nitrogen, phosphorous, arsenic, antimony, and bismuth.

6. The layered Heusler alloy of claim 2, wherein C and Z are independently selected from the group consisting of: aluminum, gallium, silicon, germanium, tin, phosphorous, arsenic, and antimony.

7. The layered Heusler alloy of claim 1, wherein
   the layered Heusler alloy is layered along the [111] direction;
   the first Heusler alloy has a formula A$_p$BC, wherein:
     p is 1 or 2;
     A and B are each a transition metal, with the proviso that A and B are not the same transition metal; and
     C is an element from Group 13, 14, or 15;
   the first layer comprises a first number of sublayers, the first number of sublayers being 4, 6, or 8;
   the second Heusler alloy has a formula X$_q$YZ, wherein:
     q is 1 or 2;
     X and Y are each a transition metal, with the proviso that X and Y are not the same transition metal; and
     Z is an element from Group 13, 14, or 15;
   the second layer comprises a second number of sublayers, the second number of sublayers being 4, 6, or 8; and
   the sum of the first number of sublayers and second number of sublayers is 12, such that:
     when the first number of sublayers is 4, the layered Heusler alloy has a unit cell comprising (A$_p$BC)(X$_q$YZ)$_2$, wherein p and q are independently 1 or 2;
     when the first number of sublayers is 8, the layered Heusler alloy has a unit cell comprising (A$_p$BC)$_2$(X$_q$YZ), wherein p and q are independently 1 or 2; and
     when the first number of sublayers is 6, the layered Heusler alloy has a unit cell comprising (A$_p$BC)(A$_{p-1}$XBZ)(X$_q$YZ), wherein p and q are independently 1 or 2.

8. The layered Heusler alloy of claim 7, wherein:
   A and B are selected from the group consisting of: scandium, titanium, vanadium, chromium, manganese, iron, cobalt, nickel, yttrium, zirconium, niobium, molybdenum, technetium, ruthenium, rhodium, and palladium; and
   X and Y are selected from the group consisting of: scandium, titanium, vanadium, chromium, manganese, iron, cobalt, nickel, yttrium, zirconium, niobium, molybdenum, technetium, ruthenium, rhodium, and palladium.

9. The layered Heusler alloy of claim 7, wherein:
A and B are selected from the group consisting of: titanium, vanadium, chromium, manganese, iron, cobalt, nickel, rhodium, and palladium; and
X and Y are selected from the group consisting of: titanium, vanadium, chromium, manganese, iron, cobalt, nickel, rhodium, and palladium.

10. The layered Heusler alloy of claim 7, wherein C and Z are independently selected from the group consisting of: boron, aluminum, gallium, indium, thallium, carbon, silicon, germanium, tin, lead, nitrogen, phosphorous, arsenic, antimony, and bismuth.

11. The layered Heusler alloy of claim 7, wherein C and Z are independently selected from the group consisting of: aluminum, gallium, silicon, germanium, tin, phosphorous, arsenic, and antimony.

12. The layered Heusler alloy of claim 1, wherein the first Heusler alloy and the second Heusler alloy are selected from the group consisting of $Co_2CrSi$, $Co_2CrSb$, $Co_2FeSi$, $Co_2MnAl$, $Co_2MnSi$, $Co_2MnSb$, $Co_2TiGe$, $Co_2VGa$, $Co_2VSn$, $Fe_2MnAl$, $Fe_2MnGa$, $Fe_2MnSi$, $Fe_2TiGe$, $Fe_2TiSi$, CoMnP, CoTiP, RhFeGe, RuMnAs, NiMnP, NiMnSi, NiMnAs, NiMnSb, NiVSb, CoMnSb, and CoTiSi.

13. The layered Heusler alloy of claim 1, wherein the first Heusler alloy comprises a half metal or a near half metal.

14. The layered Heusler alloy of claim 1, wherein the second Heusler alloy comprises a half metal or a near half metal.

15. The layered Heusler alloy of claim 1, wherein the magnetocrystalline anisotropy of the layered Heusler alloy along a direction perpendicular to the layering direction is from greater than $0$ $J/m^3$ to $10^6$ $J/m^3$.

16. The layered Heusler alloy of claim 1, wherein the $\mu_0 H_{eff}$ of the layered Heusler alloy is from $-10$ to $10^{10}$ $N\,A^{-1}\,m^{-1}$.

17. The layered Heusler alloy of claim 1, wherein the layered Heusler alloy has a $\mu_0 H_{eff}$ of greater than $0$ $N\,A^{-1}\,m^{-1}$.

18. The layered Heusler alloy of claim 1, wherein the layered Heusler alloy further comprises:
a third layer comprising a third Heusler alloy with a fcc crystal structure, the third Heusler alloy being different than the first Heusler alloy, the second Heusler alloy, or combinations thereof; and
the first layer, the second layer, and the third layer are layered along the layering direction.

* * * * *